US012700733B2

(12) United States Patent
Brunier

(10) Patent No.: US 12,700,733 B2
(45) Date of Patent: Aug. 4, 2026

(54) SYSTEMS AND METHODS FOR SEAMLESSLY TRANSFERRING A LOAD BETWEEN TWO AC SOURCES OF AC ELECTRICAL POWER

(71) Applicant: Jack Brunier, Fort Lauderdale, FL (US)

(72) Inventor: Jack Brunier, Fort Lauderdale, FL (US)

( * ) Notice: Subject to any disclaimer, the term of this patent is extended or adjusted under 35 U.S.C. 154(b) by 0 days.

(21) Appl. No.: 19/105,813

(22) PCT Filed: Aug. 23, 2023

(86) PCT No.: PCT/US2023/030960
§ 371 (c)(1),
(2) Date: Feb. 23, 2025

(87) PCT Pub. No.: WO2024/044272
PCT Pub. Date: Feb. 29, 2024

(65) Prior Publication Data
US 2026/0066655 A1 Mar. 5, 2026

Related U.S. Application Data

(60) Provisional application No. 63/419,652, filed on Oct. 26, 2022, provisional application No. 63/402,402, (Continued)

(51) Int. Cl.
*H02J 3/007* (2026.01)
*H02J 3/38* (2026.01)
(Continued)

(52) U.S. Cl.
CPC ................ *H02J 3/007* (2020.01); *H02J 3/38* (2013.01); *H02J 13/10* (2026.01); *H02J 13/12* (2026.01);
(Continued)

(58) Field of Classification Search
CPC .... H02J 3/00; H02J 7/00; H01M 1/00; H02M 5/00; H02M 7/00
See application file for complete search history.

(56) References Cited

U.S. PATENT DOCUMENTS 7,253,538 B2 * 8/2007 Fujita ......................... B63J 3/04
307/18
2005/0184592 A1 * 8/2005 Marwali ................... H02J 9/06
307/52
(Continued)

FOREIGN PATENT DOCUMENTS

JP 3947176 7/2007
JP 3947176 B2 * 7/2007 .............. H02J 9/061

OTHER PUBLICATIONS

International Search Report and Written Opinion issued in App. No. PCT/US23/030960, mailing date Dec. 26, 2023, 9 pages.

*Primary Examiner* — Rexford N Barnie
*Assistant Examiner* — Joseph N Inge
(74) *Attorney, Agent, or Firm* — FisherBroyles, LLP

(57) ABSTRACT

Methods for switching the power source supplying an alternating current (AC) electrical load from a first AC power supply to a second AC power supply comprising: (a) determining, during a time period, the zero voltage crossings of at the first and second AC power supplies; (b) estimating for a future time period, based on information obtained in said determining step (a), the times at which a series of future current zero-crossings of said AC load and at least the current zero-crossing of the second power supply; (c) based on said estimating step (b), determining whether during said future time period the time of said zero-crossing of said load current and the zero-crossing of the second power supply are within about 0.1 microseconds of each other; and (d) for a time period during which said zero crossings are estimated to be within 0.1 microseconds of each other, switching said (Continued)

load to said second power supply at said time at which said zero crossings are estimated to be within 0.1 microseconds of each other, wherein said switching: (i) uses a solid-state switching system and microprocessor-based control system for actuating said solid-state switching circuit; and (ii) accounts for any known actuation delay between the actuation signal from said microprocessor and the occurrence of said switching.

9 Claims, 22 Drawing Sheets

Related U.S. Application Data filed on Aug. 30, 2022, provisional application No. 63/400,357, filed on Aug. 23, 2022.

(51) Int. Cl.
| | | |
|---|---|---|
| *H02J 13/10* | (2026.01) | |
| *H02J 13/12* | (2026.01) | |

| | | |
|---|---|---|
| *H02J 101/10* | (2026.01) | |
| *H02J 105/30* | (2026.01) | |
| *H02J 105/33* | (2026.01) | |

(52) U.S. Cl.
CPC ....... *H02J 2101/10* (2026.01); *H02J 2105/31* (2026.01); *H02J 2105/33* (2026.01)

(56)               References Cited

U.S. PATENT DOCUMENTS

| | | | | |
|---|---|---|---|---|
| 2012/0293004 A1* | 11/2012 | Hashimoto | ............... | H02P 9/02 |
| | | | | 307/82 |
| 2016/0133411 A1* | 5/2016 | Bock | ......................... | H02P 1/26 |
| | | | | 361/187 |
| 2019/0089146 A1* | 3/2019 | Li | ......................... | H02H 7/0858 |
| 2020/0365345 A1* | 11/2020 | Telefus | ................... | H02H 3/08 |
| 2021/0305908 A1* | 9/2021 | Kodera | ................... | H02M 1/32 |

* cited by examiner

FAST SWITCH SYSTEM

| Amps | Contactor # | Type |
|------|-------------|--------|
| 50 | AF40-22-00-13 | 4 Pole |
| 50 | AF40-30-11-13 | 3 Pole |
| 100 | AF80-22-00-13 | 4 Pole |
| 100 | AF96-30-00-13 | 3 Pole |

(K1)(K1A) Boost (K3)(K3A) Cords

| Amps | Contactor # | Type |
|---|---|---|
| 50 | AF40-22-00-13 | 4 Pole |
| 50 | AF40-30-11-13 | 3 Pole |
| 100 | AF80-22-00-13 | 4 Pole |
| 100 | AF96-30-00-13 | 3 Pole |

Hubbell Auto
Boost
Transformer B

CTB inserted on
transformation B primary

| Project Designer JB | V2 | NAUTI-TECH SYSTEMS | 3219 South Andrews Ave Fort Lauderdale Fl. 33316 Tel: (954) 5270716 Fax: (954) 527 0715 |
|---|---|---|---|
| DATE: 02/21/2022 | REV. Date: 08/22/23 | | |

| Amps | Contactor # | Type |
|------|-------------|--------|
| 50 | AF40-22-00-13 | 4 Pole |
| 50 | AF40-30-11-13 | 3 Pole |
| 100 | AF80-22-00-13 | 4 Pole |
| 100 | AF96-30-00-13 | 3 Pole |

| SCALE: | Project Designer JB | V2 | | 3219 South Andrews Ave |
|--------|---------------------|-----|-----|------------------------|
| FAST -PMS Hybrid | DATE: 02/21/2022 | REV: Date 08/20/23 | NAUTI-TECH SYSTEMS | Fort Lauderdale Fl. 33316 Tel: (954) 527 0716 Fax: (954) 527 0715 |

SYSTEMS AND METHODS FOR SEAMLESSLY TRANSFERRING A LOAD BETWEEN TWO AC SOURCES OF AC ELECTRICAL POWER

CROSS REFERENCE

The present application is a 371 National Stage Entry application of International Application No. PCT/US2023/030960, filed Aug. 23, 2023, which is related to and claims the priority benefit of each of the following provisional applications: 63/419,652, filed Oct. 26, 2022; 63/402,402, filed Aug. 30, 2022 and 63/400,357, filed Aug. 23, 2022, each of which is incorporated herein by reference in their entirety.

FIELD OF INVENTION

The present invention relates to systems and methods for seamlessly transferring an alternating current (AC) load between electrical power originating from two or more sources, including but not necessarily limited to particular embodiments in which the load and one of the power sources is located on-board a vehicle or vessel, such as RVs, boats and the like, and in which the other power source is located off-bard the vehicle or vessel.

BACKGROUND

Larger boats and ships, as well as recreational vehicles (RVs), generally include one or more on-board electrical AC power sources, such as generators, which supply electric power for the ship or vehicle when it is underway. However, in the case in which a ship is berthed in port for a period of time, or when an RV is parked for a period of time, such vehicles have on-board equipment that continues to run, and which can consume a large amount of electric power. For example, it is often desired for air conditioning units, refrigerators, freezers, as well as lighting, entertainment, and computer equipment, to continue to operate when the vehicle is at berth or parked. However, AC electricity generation via on-board sources is generally much less efficient and much more costly than electricity that is generally available from the stationary electrical grid available at the dock, the RV parking space or the like. In addition, continuing to run the on-board generators while the vehicle is stationary is not environmentally friendly since such operation will generally result in a large amount of combustion exhaust gas, which causes air pollution in the case of land-based vehicles, and air and water pollution in the case of water-born vehicles. Accordingly, it is highly desirable to discontinue use of the on-board power sources, such as diesel generator(s), when the vehicle is at berth or parked in a location that has a source of alternating current electrical power available from a stationary electrical grid.

Prior to the present invention, it has been common that when the vehicle is berthed or parked, the operator would shut down the generator(s) as one step in connecting to the stationary electrical grid, and the on-board loads would also have to be then manually disconnected from the vehicle's main bus bar so that the electric power from the stationary source could be connected to the main bus bar. As a result, an interruption of power supply was associated with the switch to stationary power. Such an interruption is not only highly inconvenient, but it can also be detrimental to many devices if the devices are not individually shut down prior to shutting down the generator. Thus, the time required to complete the change-over can be quite long, especially for larger vehicles that have a large number of devices operating on AC electrical power. In addition, the shut-down and start-up procedures for such equipment frequently must be precisely followed in order to avoid damage to the device. Thus, such a procedure for changing-over from on-board to stationary electrical power has many disadvantages.

One alternative to the manual shutdown and restart procedure described above is disclosed in U.S. Pat. No. 7,253,538 (hereinafter the '538 Patent). The procedure described in the '538 patent is to change-over from a power source of generator(s) on a ship to a power source supplied from shore using a control system that first synchronizes the frequencies and voltages of the on-board generators with the frequencies and voltages of the on-shore power sources. However, this process has several disadvantages. For example, the '538 patent itself acknowledges that adjusting the frequencies of the generators, which necessarily occurs while the generator is in operation, to the frequency of the power source from shore is very difficult. Moreover, allowing a switching system to take-over control of the generator speed, bypassing or tricking the OEM controls, will often nullify the warranty on the generator. This is a substantial disadvantage of such systems. Additional disadvantages are that such systems are expensive, difficult to install and adjust, and are subject to on-board generators being well maintained and operating close to original specifications and capable of running steadily close to shore frequency.

Applicant has recognized these disadvantages of prior methods of converting from one AC power source (such as an on-board power source) to another AC power source (such as a stationary power source located at the berth for a vessel) and has developed systems and methods which overcome one or more of these disadvantages and other disadvantages and which provide many beneficial results, and in some cases it is surprising and unexpected that these beneficial results could be achieved, as described in detail hereinafter.

SUMMARY

The present invention includes systems for controlling the switching of an alternating current (AC) load contained in a land, sea or air vehicle from an on-board AC power generator to an off-board AC power supply comprising:

(a) means for sensing the voltage, current and phase as a function of time of each of said off-board AC power supply and said AC load; and (b) a power control module that comprises:

(i) means connected to said sensing means for monitoring at least one wave characteristics of each of said power generator, said off-board AC power supply and the current of said AC load;

(ii) means for providing an estimate for a given future time period of the voltage zero-crossings of said power generator and said off-board AC power supply to determine, based on said estimate of the existence or not of a synchronous zero voltage crossing during the given time period and, when a synchronous zero voltage crossing is estimated to exist, for determining the time of synchronous zero current crossing of said AC load current and said off-board AC power supply;

(iii) a first solid-state switching circuit operating in a closed state connected between said on-board AC power source and said load; and

(iv) a second solid state switching circuit, that may be equivalent to or not equivalent to said first solid state switching circuit, in an open state and connected between said off-board stationary AC power supply and said load; and (v) microprocessor-based control means for sending an actuation signal to change the state of each of said first and second switching circuits, wherein: (i) a known actuation delay exists between said microprocessor actuation signal being initiated and actuation of said first solid switching circuit to change from said open state to said closed state; (ii) a known actuation delay exists between said microprocessor sending said actuation signal being initiated and actuation of said second solid state switching circuit to change from closed to open; and (iii) said microprocessor initiates said actuation signal to each of said first solid state switching circuit and said second solid state switching circuit at a time in advance of said synchronous zero current crossing, if determined to be present, by an amount equal to about said respective known actuation delays.

The present invention also includes methods of converting the electricity supplying an alternating current (AC) load from a first AC power source which is powering said load to a second AC power source which is not powering said load comprising:

(a) measuring over a time interval the phase of the current and the voltage of the AC load and of the first and second AC power source, (b) determining the voltage zero-crossings of said first and said second AC power sources occurring during said time interval;

(c) using a microprocessor-based system to estimate, based on information obtained in said determining step (b), the time of one or more future synchronous zero voltage crossings of said first and said second power source and the time of one or more future synchronous zero current crossings of said second power source and said load;

(d) providing (i) a first solid-state switching circuit in a closed state and connected between said first AC power source and said AC load and (ii) a second solid state switching circuit, that may be equivalent to or not equivalent to said first solid state switching circuit, in an open state and connected between said second AC power source and said AC load;

(e) using a microprocessor-based system to send an actuation signal to close said second solid state switching circuit and an actuation signal to open said first solid state switching circuit, wherein each of said first and said second solid state switching circuits has a known actuation delay between the actuation signal being sent from said microprocessor to said switching circuit and the occurrence of said actuation; and (f) at a time prior to said synchronous zero current crossing estimate equal to about said respective actuation delay of said second switching circuit, sending an actuation signal using said microprocess-based system to: (1) change the state of said second solid state switching from open to closed and (2) change the state of said first solid state switching from closed to open.

The present invention also includes systems for seamlessly switching the electricity supplying an alternating current (AC) load contained in a vehicle or vessel from/to an on-board AC power source to/from an off-board stationary AC power supply comprising:

(a) means for determining the voltage zero crossings of each of said off-board stationary power supply and said on-board power supply occurring during a time interval;

(b) a microprocessor-based system for estimating, based on information obtained by said determining means, the time of a series of future current zero-crossings of said AC load and at least one of said off-board stationary power supply and said on-board power supply;

(c)(i) a first solid-state switching circuit in either a closed state or an open state and connected between said on-board AC power source and said AC load, wherein said first solid-state switching circuit has a known actuation delay between the actuation signal from said microprocessor and the occurrence of said switching; and (c)(ii) a second solid state switching circuit, that may be equivalent to not equivalent to said first solid state switching circuit, in either an open state or a closed state opposite of the state of said first switching circuit and connected between said off-board stationary AC power supply and said AC load, wherein said second solid state switching circuit has a known actuation delay between the actuation signal from said microprocessor and the occurrence of said switching, wherein said microprocessor system includes means to (i) estimate a future time at which a synchronous zero crossing of said load current and said power source current that is connected to the switch in the open state and (ii) send, at a time prior to said synchronous zero-crossing estimate equal to about said respective actuation delay, a triggering signal to solid-state switching circuit in the open state to change the state of the circuit to closed.

The present invention also includes methods for seamlessly switching the electricity supplying an alternating current (AC) load from a first AC power supply to a second AC power supply comprising:

(a) determining during a time period the zero voltage crossing(s) of at least the first and second AC power supplies;

(b) estimating for a future time period, based on information obtained in said determining step (a), the times at which a series of future current zero-crossings of said AC load and at least the current zero-crossing of the second power supply occur;

(c) based on said estimating step (b), determining whether, during said future time period, the time of said zero-crossing of said load current and the zero-crossing of the second power supply are within about 0.1 microseconds of each other; and (d) for a time period during which said zero crossings are estimated to be within 0.1 microseconds of each other, switching said load to said second power supply at said time at which said zero crossings are estimated to be within 0.1 microseconds of each other, wherein said switching: (i) uses a solid-state switching system and microprocessor-based control system for actuating said solid-state switching circuit; and (ii) accounts for any known actuation delay between the actuation signal from said microprocessor and the occurrence of said switching.

DEFINITIONS

Figure 1A:
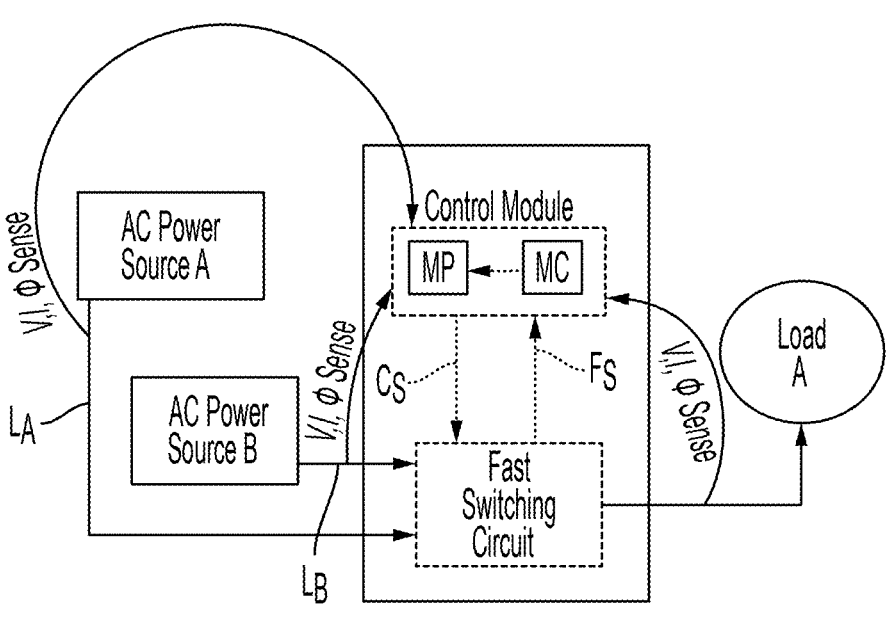
FIG. 1A is a schematic block flow diagram showing the systems and methods according to one aspect of the present invention.

The terms "SCR" means silicon controlled rectifier which is a solid-state current-controlling device with at least four layers.

The term "thyristor" means a three lead SCR with at least four layers of alternating N-type and P-type substrate materials and having a gate, an anode and a cathode.

The term "vehicle" means a thing used for transporting people and/or goods on land or water or through air or space.

The term "control module" as used herein means hardware and/or software that is able to sense a property of an electrical current and/or receive sensing signals a property of an electrical current and to produce a control signal based at least in part on said sensed property.

The terms "Connecting Source" and "CS" mean the source of AC power to which the load will be switched using the present methods and systems.

The terms "Disconnecting Source" and "DS" mean the source of AC power which will be disconnected from the load using the present methods and systems.

DETAILED DESCRIPTION

The present invention includes systems and methods which utilize fast automatic switching technology according to the present invention (sometimes referred to herein for convenience as FAST) to switch an AC load between a first source of AC current and a second source of AC current. Applicants have surprisingly found that source transfers, which have been difficult and prone to error in the past, can be achieved in a relatively seamless fashion from the perspective of the user according to the systems and methods of the present invention. By way of example, an owner or operator of a large sea going vessel (e.g., 55 feet long or longer) will only need to set a control button or to specify a setting on a touch screen or the like on the ship's automatic power control console to "automatic" as the vessel approaches a berth or dock to convert operation of the vessel's electrical systems from on-board power (usually a generator) to shore power. The present systems and methods can accommodate switching in applications that have multiple loads. For example, the present systems and methods are operable with on-board power distribution systems that have two load buses. In such cases, the present methods and systems preferably include a tie breaker circuit, and preferably the tie breaker is open so that the connection is to a single active source (described in more detail hereinafter) in advance of the seamless transfer operation. In addition, however, an embodiment of the present invention includes the use of thyristor pairs as described hereinafter coupled to the tie breaker circuit to enhance the seamlessness of the transfer when multiple loads are used. Furthermore, if there are multiple power sources to which the load may be switched, such as multiple off-board power sources in the case of a ship docking, these multiple sources are preferably combined prior to switching (preferably as described hereinafter), or if not previously combined then preferably the systems and methods use thyristor pairs as described hereinafter coupled to the tie breaker circuit to enhance the seamlessness of the transfer. Once the vessel is docked, the on-shore power chord(s) can then be plugged into the preferred systems of the present invention, and power will be seamlessly converted from on-board to off-board sources without the ship operator needing to manually shut down or to adjust the speed of the on-board generators or to shut down any of the on-board equipment. The present systems and methods are able to achieve such seamless switching even in cases in which there are two or more available sources of shore power and two (and potentially more than two) on-board generators. It is to be noted, however, that in the case of connecting from a sea going vessel using an on-board power source to an off-board power source, the present invention preferably utilizes isolation transformers, or galvanically isolated frequency converters/voltage regulators, between the off-board power source and the present switching system, which in preferred embodiments comprises switch gear circuit breakers to protect the remaining components of the present invention. In cases in which the off-board source of AC electricity does not include isolation transformers, or galvanically isolated frequency converters/voltage regulators, it is possible to include such isolation transformers or galvanically isolated frequency converters/voltage regulators as a component of the present systems. For example, in connection with the use of the present systems and methods for switching RV power, most RVs have a single AC generator and parking locations will usually have a single source of off-board AC power that does not have isolation transformers. Thus, in many of such embodiments the present systems preferably comprise an isolation transformer or a galvanically isolated frequency converter/voltage regulator which will be located between the off-board AC source and the switch gear circuit breakers.

Although the systems and methods of the present invention include many embodiments and optional components and steps to accommodate a wide variety of situations and user needs, an important element of the most preferred embodiments is a fast switching system and/or method that comprises a solid-state switching circuit and a control module for the solid-state switching circuit. Each of these parts of the present system is described in detail hereinafter, it being understood that the headings used hereinafter are used for convenience but not by way of limitation.

Control Module and Control Step

Importantly for the most preferred embodiments of the present invention, the preferred control modules and control steps are capable of sensing and/or determining at least the zero current crossing of the load being switched and the current zero-crossing of the source to which the load will be switched (hereinafter sometimes referred to for convenience as the connecting source or the CS). In order to implement the monitoring means and steps of the present invention, each of the power sources and the loads includes, or has probes or sensors attached, directly or indirectly, to the power sources and load, which provides a signal that represents, or from which can be derived, the voltage, current, power factor, and phase at each point and over a period of time representing at least several AC cycles (preferably at least about 5 cycles), and the monitoring means and methods utilize the signals to develop a time-dependent measure of the voltage and the current for the load and the CS, and preferably the power source which will be disconnected, which in turn provides information on the relative phase and zero-crossing of voltage and current of each. In preferred embodiments the current is sensed via current transformers (CTs) inserted on the primary of the transformers, which allows for a safe disconnect, and the voltage is preferably sensed with direct wiring to a chip or microprocessor in the control module of the present invention.

The present invention also includes means and methods for estimating or predicting one or more of the next zero crossings, particularly and especially the zero-crossing(s) of the source voltages, source currents and the load voltages and currents, based upon the monitoring information obtained from the monitoring means and methods. Put another way, the present invention in preferred embodiments includes an electronic computing device, such as a microprocessor, which is able to use as inputs the time-dependent zero crossing information obtained from at least the current sensors over a number of cycles, for example over 300 to about 600 cycles, which for 60 cycle per second sources represents about 5 to about 10 seconds and about 600 to about 1200 zero crossings (i.e., two zero crossings per cycle). Based on this data, an estimate of the next zero crossings for a period of time is developed. In preferred embodiments, zero crossing estimates are calculated until the occurrence of a substantially simultaneous zero crossing for the load current(s) and for the CS current(s) is identified, and preferably such a Synchronous Zero Crossing of the currents is identified within about 300 to about 600 future cycles, which for 60 cycle per second sources represents about 5 to about 10 seconds into the future, although those skilled in the art will appreciate that these time intervals can be adjusted widely within the scope of the present invention depending on the needs of each particular system. As used herein, a substantially simultaneous zero estimate occurs when the load current zero crossing estimate and the CS current zero crossing estimate are within about 0.1 microseconds of each other, and such estimated occurrence is sometimes referred to herein as Synchronous Current Zero Crossing or SCZC.

Figure 11:
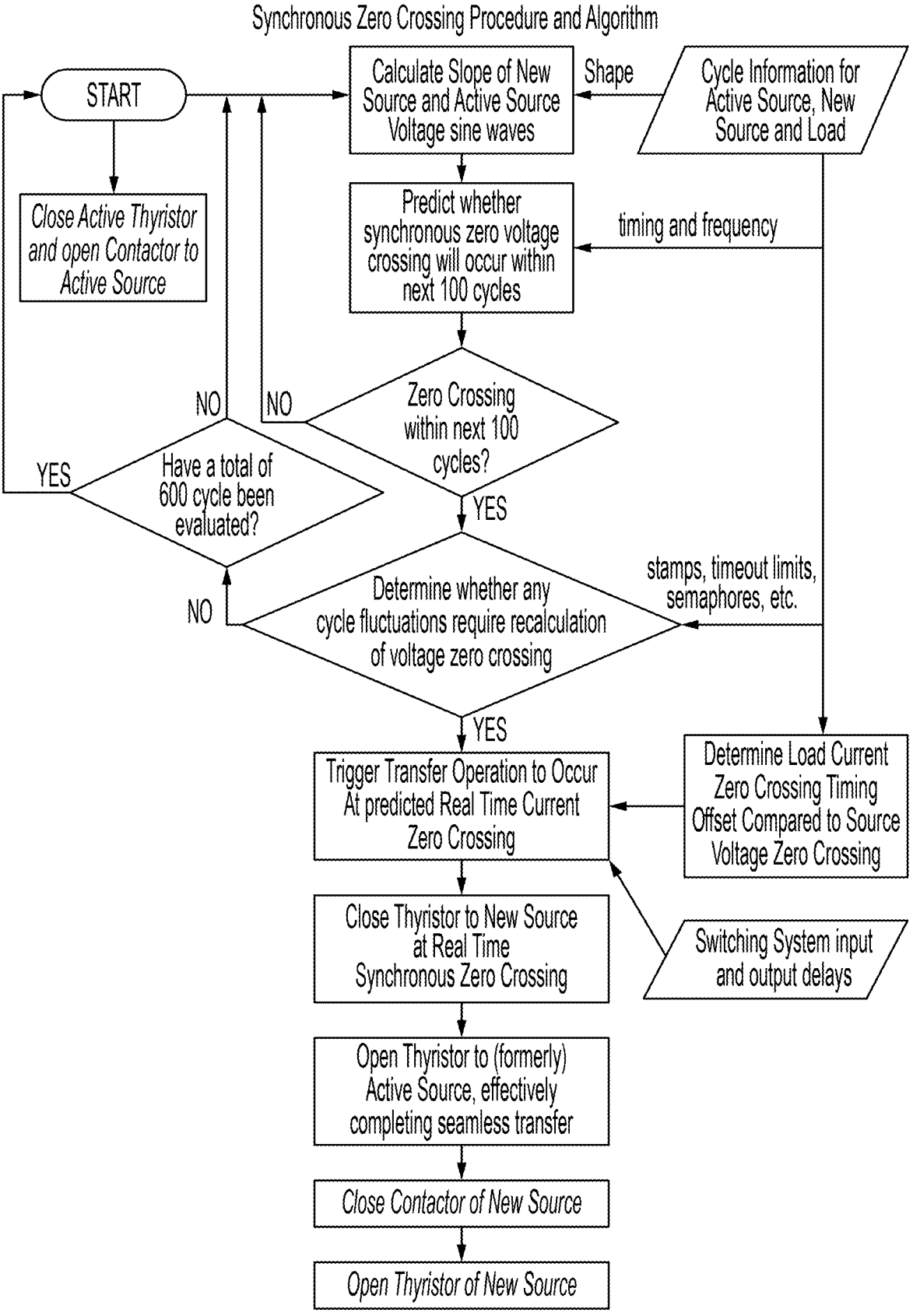
FIG. 11 is flow diagram for a preferred procedure and algorithm for determining whether a synchronous zero crossing and the time of same.

A preferred procedure and algorithm for determining whether a zero-crossing will occur is illustrated in FIG. 11. In such preferred procedure as illustrated in FIG. 11, the steps which are depicted in italics and in bold are generally required or preferred for those systems in which a hybrid switching system is used as described herein which comprises both solid-state and non-solid-state switching elements. Thus, for hybrid switching systems the active AC power supply will generally be in operation with the actuator (non-solid-state component) in the closed state and the thyristor (solid-state switching component) in the open state. As described herein, such preferred embodiments can have several benefits, including extending the working life-time of the solid-state components and/or reducing the need for heat-removal components from the system.

As illustrated in FIG. 11, a step associated at about the start of the switching procedure is to close the active thyristor and open the actuator, is depicted in italics and bold in FIG. 11. The procedure also includes the step of calculating one or more characteristics of the voltage and current wave of each of the sources and of the load(s). In certain preferred embodiments as illustrated in FIG. 11, the voltage wave of both the Active Source and the Connecting Source is monitored for relevant information characteristic of the voltage, including as it changes with time. Preferably, the voltage wave (which is generally in the nature of a sine wave) characteristic which is determined is the slope of the wave, particularly as it approaches zero crossing of the voltage, for each of the sources. Such determination is made based in part on cycle information, which is provided preferably by known means for sensing and reporting information to a microprocessor system. This information, together in preferred embodiments with other information, such as timing and frequency, which may be useful, is used to predict or estimate whether a synchronous voltage zero crossing (SVZC) will occur for a given or predetermined period in the future, for example, over the course of the next 100 cycles. If an SVZC of the two sources (AS and CS) is determined by such estimate to occur within the selected time period, it is preferred that the present systems and methods continue to monitor the operating characteristics of the system, including stamps, timeout limits, semaphores and the like, to determine whether any such information indicates that the SVZC should be recalculated. If no recalculation is indicated, then the present methods and systems preferably determine, based on the predicted time for the SVZC, the time lag or advance which will occur relative to the time at which the SCZC will occur. Based on such time for the SCZC and on the lab/advance, the present system and methods will proceed to trigger a transfer of the load to the New Source or CS such that transfer will occur in real time at the predicted SCZC, taking account for the known switching system input and output delays (i.e., lag). The triggering event will result in closing of the solid-state switch (such as thyristor) to the CS at the real time SCZC and opening at about the same time the solid-state switch (such as thyristor) of the formerly active source (AS). In a hybrid system, the switching system would remain operating with the thyristor connected to the CS for a period of time determined to provide recognition of effective and stable operation with the CS, and then the contactor to the CS is closed and thyristor opened.

If no SVCZ or SCZC is predicted and found to remain predicted for the predetermined time period (for example, 100 cycles as illustrated in FIG. 11), then the process of calculating slope, etc. will be restarted. In preferred embodiments, this repeat cycle can be implemented for any number of times determined to be appropriate by those skilled in the art in view of the teachings contained herein. For example, in preferred embodiments, the search for a SVZC will be repeated 10 times, for a total of 600 cycles at 60 Hz. If no triggering event is initiated after such 600 cycle time frame, the process is preferable repeated 10 more times, with 600 cycles being evaluated in each such repeat, until a trigger event is completed. If ultimately no such triggering event occurs after all of such repeated attempts, a message will be forwarded to the user and/or system operator indicating that a seamless transfer was determined to be not possible within the selected set of repeat parameters. At this point, the user preferably will have the option to repeat the effort for a seamless transfer or to switch using an alternative switching means.

Importantly, as mentioned above and discussed in more detail hereinafter, the present invention includes at least a first solid-state switching circuit connected between the first AC power source and the load and a second solid-state switching circuit connected between the second AC power source and the load. The first and second solid-state switching circuits can be the same (i.e., equivalent) in terms of their electrical characteristics or different, but in preferred embodiments the first and second switching circuits are equivalent or identical to one another. In either case, applicants have come to appreciate that a time delay will exist between (1) the initiation of a trigger signal to change the state of the solid-state switch and (2) the actual either opening or closing of the switch. Applicants have found that this time delay is relatively short in an absolute sense (preferably on the order of about 2 to about 10 microseconds), and applicants have come to appreciate that this delay, and also the delay between actual zero crossing and the time that the microprocessor records a zero crossing event (also on the order of about 2 to about 10 microseconds) can and does have a significant effect on the ability to achieve a high level of seamless switching according to preferred aspects of the present invention between two AC sources such that operating equipment will not experience any detrimental impact due to the switching process. This is an especially important consideration in the frequently encountered situation in which the devices operating on the load include rotating equipment and/or computer devices. An important aspect of the present systems and methods, therefore, is the feature of initiating the triggering signal for changing the state in at least one of the first and second solid-state switches at a time preceding the estimated next Synchronous Zero Crossing (SZC) that is equivalent to about such delay (s). Furthermore, the preferred requirement that the time for sending the triggering signal precedes the SZC by "about" such delays means such delay period +/– a buffer time of about 0.5 microseconds or less since applicant has found that in many embodiments the actuation signal preferably reaches the switching circuit in advance of the SZC by about 0.5 microseconds or less. In this way, applicants have discovered and found systems and methods capable of switching from a first alternating current power source and a second alternating current power source in a seamless fashion which does not require any of the devices on the load to be shut down prior to switching, which does not require the present system or the user to take control of the generator in an attempt to match voltage and phase, and at the same time prevents potential damage or detriment to such devices which might otherwise occur as the result of such simultaneous conversion of the electrical supply from one source to another source.

Solid State Switching Circuits

Those skilled in the art will be able, given the disclosures and teachings contained herein, to select from various fast, solid state switching circuits that can be adapted for use in the present systems and methods, and all such solid-state switching circuits are within the broad scope of the present disclosure. In preferred embodiments, however, the present solid-state switching circuit comprises at least one thyristor, and even more preferably two thyristors connected in what is known in the art as back-to-back or anti-parallel configuration. Such a preferred configuration is disclosed in FIG. 1C and is especially advantageous for use in connection with switching AC currents in accordance with the present invention. It is contemplated that in some embodiments the present invention may be adapted to use a Triac, or the equivalent of a Triac, in place of a back-to-back thyristor arrangement.

The present invention includes embodiments in which the solid-state switching circuit of the present invention consists of switches that consist of SCR switches to make and maintain the switch to the CS. A detailed circuit diagram showing such embodiment is provided in FIG. 5A. However, applicants have recognized that in such embodiments a relatively high level of heat can be generated by the switches, including particularly back-to-back thyristors, and in order to maintain the reliability of such systems it is preferred that the switching circuit be cooled with a fan (shown by the picture of a fan) or other means to remove heat from the circuit. It will be appreciated, however, that in some applications (including particularly retrofit applications) space constraints or other constraints may make the use of fans or other heat removal techniques not feasible. In order to address such a case, and for other advantageous reasons, applicants have developed a preferred solution in which the switching circuit comprises an SCR switching portion, preferably back-to-back thyristors, and an electro-mechanical switching portion. Detailed circuit diagrams of such preferred embodiments are shown in FIGS. 5B, 6, 7A and 7B, and in such embodiments the thyristor package operates as explained herein to achieve seamless switching. However, the microprocessor includes programming which bypasses the thyristors and channels the current flow through an electromechanical switch under the control of the microprocessor until another seamless switching event is required. In this way, the need for external cooling can be avoided, and the longevity of the thyristors can be extended.
Description of Systems and Methods The simplified schematic drawing provided in FIG. 1A represents an embodiment of the present invention including a first and a second AC power source and a load. In view of the entire disclosure contained herein, those skilled in the art will appreciate that the present invention is not limited with respect to the number of power sources that can be switched, nor is the invention limited to the switching of a single load. Thus, the schematic illustration of FIG. 1A is provided to facilitate explanation of an important aspect of the invention in a simple and convenient way, but without necessarily limiting the invention to the number of power sources and loads depicted therein. As illustrated in FIG. 1A, the present invention includes a solid state switching circuit (as described herein and specific preferred embodiments of which are disclosed in detail hereinafter), which is connected on the input side to line A (designated as LA in the figure) and to line B (designated as LB in the figure) from a first AC power source A and a second AC power source B, respectively, and on the output side to a Load A. Although the lines from each power source and to the load are shown as a single line, it will be appreciated by those skilled in the art that such AC power typically includes multiple lines. For example, the three-wire single phase system commonly used in North America for residential and light commercial applications includes two (2) live (hot) wires, and a neutral, connected to ground. Typically, single pole circuit breakers feed 120 V circuits from one of the 120 V buses within the panel, or two-pole circuit breakers feed 240 V circuits from both buses. Accordingly, the depiction of single lines for the sources and the load in FIG. 1A is for the purposes of convenience only and will be understood to represent all such modes of delivering electrical power from both stationary and mobile sources and to both stationary and mobile loads, including single phase, split phase and 3 phase systems. For three phase systems, the off-board power phases are preferably the same in single phase, or the phase rotation is preferably substantially identical in 3 phase. Similarly, although a single load is disclosed in FIG. 1A for purposes of convenience and ease of illustration, those skilled in the art will appreciate and understand that the present invention is not so limited and that two or more loads can be switched in accordance with the teachings contained herein.

Importantly, the fast switching circuitry according to the present invention preferably receives control signals $C_S$ from a control module of the present invention, which in preferred but optional embodiments, also receives feedback signals $F_S$ from the switching circuit. The control module, which may be software, hardware or a combination of software and hardware, also receives input relating at least to the phase characteristics of the load current, and in particular the zero crossing of the load current and the zero current crossing of at least the source to which the load is to be transferred. The current and voltage signal inputs can be transmitted through a sensor which is separate from the control module, or in preferred embodiments the input provides all information relating to the load current and voltage and the control module includes a specialized AC metering chip (labeled MC in the figure). In preferred embodiments, the metering chip MP includes a data stream that preferably serializes the source and load information and then transmits same as input to the main processor (labeled MP in the figure).

An important aspect of the present invention resides in the equipment and steps taken to send an open or close trigger signal to the solid-state switching circuit. In preferred embodiments, as illustrated schematically for a particular embodiment in FIG. 1B, this function is performed by a microprocessor according to the present invention. Preferably, the microprocessor is configured to contain information, relating to the particular system in which it is installed, about the time lag between a load feature (particularly and preferably the zero current crossing of the load) occurring and its availability as a data signal to the microprocessor, and also about the time lag between a source feature (particularly and preferably the zero current crossing of the source) occurring and its availability as a data signal to the microprocessor. For example, for each individual system, a short span of time (preferably on the order of from about 1 microseconds to about 10 microseconds, and even more preferably from about 2 to about 5 microseconds will elapse between the zero crossing event actually occurring and the time at which the microprocessor receives the "zero crossing" signal to from the metering chip, and such a time delay can be determined by those skilled in the art using known techniques for each individual switching system according to the present invention. Furthermore, this time delay or lag may be different for each line in this system, depending on various hardware parameters, including for example the length of traces on the printed circuit boards implementing the AC metering chip, and the delay may be different for different line characteristics. For example, the time delay may not be the same for current zero crossing and voltage zero crossing. Similarly, a time delay or lag which is a characteristic for each given system (and which may be determined by those skilled in the art using known techniques) will exist from the time a triggering signal is generated by the main microprocessor and the actual triggering of the solid-state switching circuit. All of the relevant time lag data is stored, preferably in the microprocessor and/or in memory accessible by the microprocessor. The sum of the relevant time delays (sometimes referred to herein for convenience as Total Time Delay) is determined by the microprocessor and used in accordance with the present invention to implement seamless transfer.

Figure 1B:
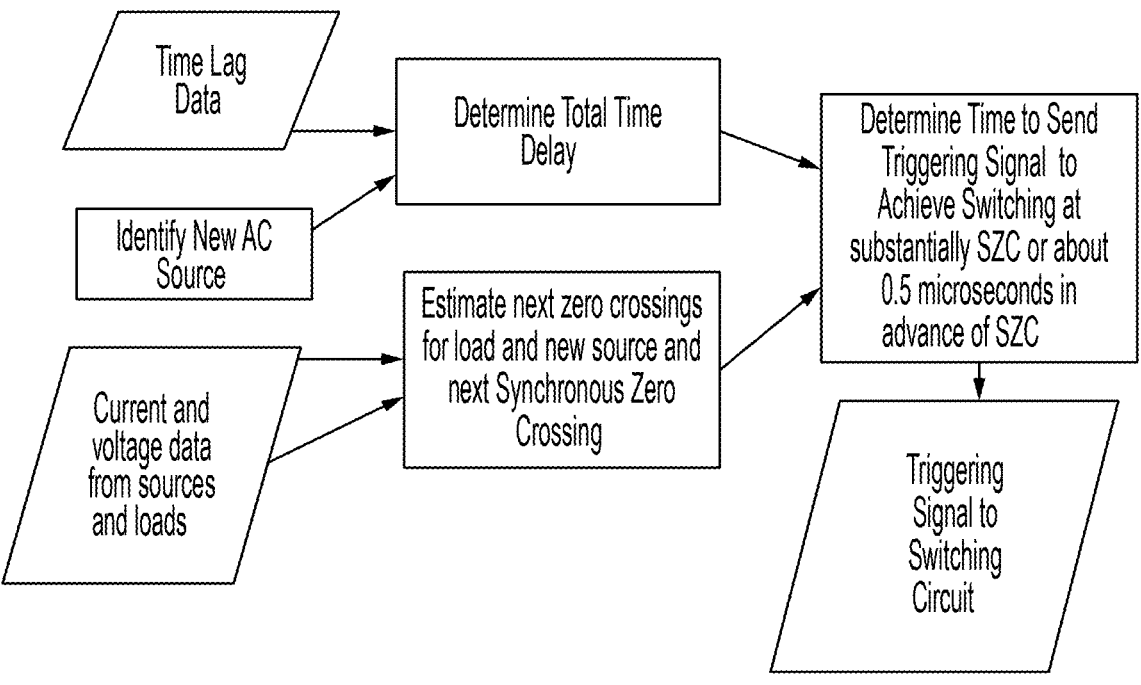
FIG. 1B is a schematic process flow diagram showing the microprocessor operation and the steps leading to a triggering signal to a solid-state switching circuit of the present invention.
Figure 1C:
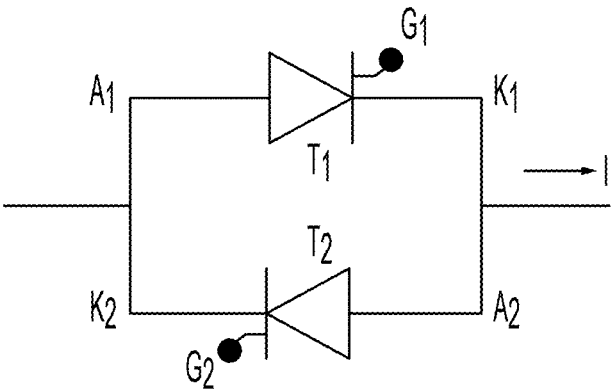
FIG. 1C is basic circuit diagram showing one embodiment of a solid-state switching circuit of the present invention.

Another important aspect of the present invention involves the step, which is also typically and preferably implemented by the main microprocessor of the present invention, of estimating future zero crossing events for the load current and for the connecting source (CS) current based upon the inputs to the main processor. Based on these estimates, the invention also preferably includes the step of estimating the next point at which the load current and the new source current will have a substantially simultaneous zero crossing. As used in this context, substantially simultaneous zero crossing means that the estimate of the time at which the two zero crossings occur are within 0.1 microsecond of each other, which is referred to hereinafter for convenience as Synchronous Zero Crossing or SZC. Based on the estimate of the next Synchronous Zero Crossing, the main microprocessor generates instructions to send a triggering signal to the fast switching circuit at a time that is prior to the estimated Synchronous Zero Crossing by an amount of time equal to about the Total Time Delay, or preferably at time that is equal to the Total Time Delay less about 0.5 microseconds. In particularly preferred embodiments, a "make" control signal is sent simultaneously to each gate of the back-to-back thyristors connected to the connecting source to arrive (in view of the Total Time Delay) at the gate about 0.5 microseconds before the estimated SZC followed by "break" signal to the switching circuit connected to the disconnecting source (DS) five microseconds latter, that is at about the estimated SZC. In this way, the present invention is able to achieve actual switching event that occurs, within very tight time tolerances, at the time that both the load current and the new source are at zero current crossing or within about 0.5 microseconds of the SZC. A block-flow diagram showing a basic logic flow for initiate actual switching at or about 0.5 microseconds ahead of a Synchronous Zero Crossing is shown in FIG. 1B.

The fast solid state switching circuit of the present invention preferably includes one or more thyristors controlled by a triggering signal generated by the microprocessor according to the present invention. In preferred embodiments each solid state fast switching circuit comprises at least one thyristor, and even more preferably two thyristors in a back-to-back arrangement. One embodiment implementing a fast solid state switching circuit of the present invention and an automatic control system of the present invention to select and then seamlessly switch between two on-board AC generators and two off-board generators to supply one or both of two on board loads is illustrated in schematic form in FIG. 3 hereof. As illustrated, the system of the present invention, in this embodiment, is connected to four (4) possible power sources: Shore A; Shore B; Generator A and Generator B. Buses from each of these sources, after an isolation transformer or a galvanically isolated frequency converter/voltage regulator, are connected to the circuit breakers of a switch gear box that comprises, for split phase systems, at least eight back-to-back thyristor packages, that is, at least one back-to-back thyristor package for each of the two lines for each of the four AC power sources, and optionally but preferably a back-to-back thyristor package as a tie switch for each of the two loads.

Figure 3:
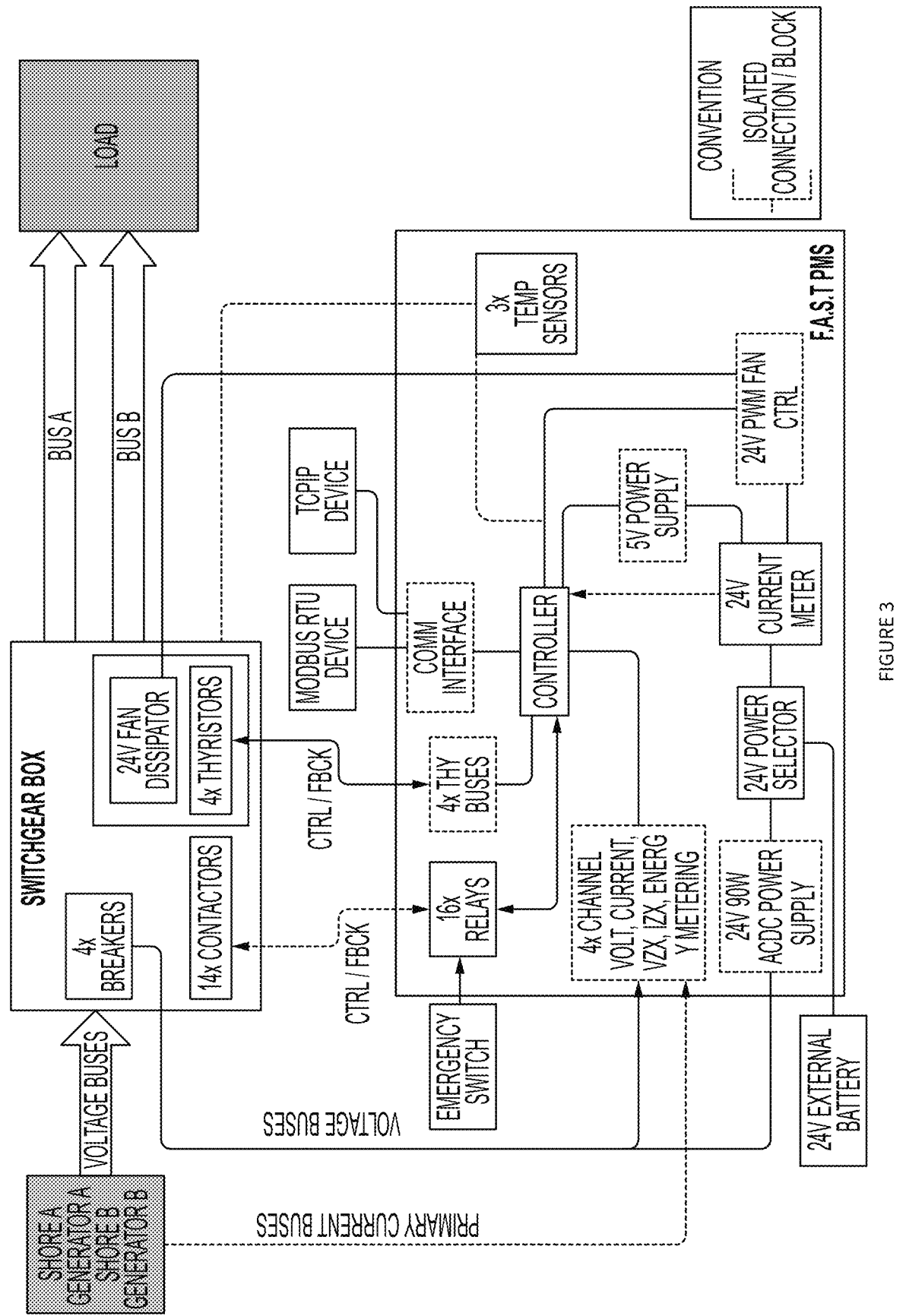
FIG. 3 is a schematic block flow chart showing the system and methods according to one embodiment of the present invention involving two off-board AC power sources, two on-board power supplies and block flow diagrams representing a switchgear box that includes solid state switching circuits of the present invention and a control box that includes a FAST switching microprocessor according to one embodiment of the present invention.

Thus, while the diagram in FIG. 3 indicates that four thyristors are present in the switch gear box, it will be understood that this is intended to refer to four (4) thyristors packages if a source is a single line source, but that for four split-phase sources, eight (8) thyristor packages will preferably be used. In preferred embodiments, the switch gear box is also provided with fans to dissipate the heat that is generated by the thyristors. In addition, fourteen contactors are present in preferred embodiments to control various aspects of selecting between the various loads in the various onboard an offboard power sources as explained in more detail in FIG. 8 hereof. In addition, in preferred embodiments as depicted in FIG. 3, the switch gear box will include at least a fifth (5$^{th}$) thyristor package (not shown in FIG. 3 but depicted in FIGS. 5A and 7A) coupled to the tie breaker circuit for two on-board load buses, and such a configuration will have the benefits as described below in connection with FIGS. 5A and 7A.

A control module according to the present invention is labeled as "FAST PMS" and includes a microprocessor for controlling the thyristors as well as a metering chip (labeled as "4× Channel: VOLT, CURRENT, VZX, IZX, ENERGY METERING") in FIG. 2. A metering chip operates, as described above, to determine the zero crossing values for current for each of the loads and the AC sources and to transmit this information to the microprocessor (labeled as "CONTROLLER") in FIG. 2. The Controller also communicates, via a communication interface, with a MODBUS RTU device and a TCPIP device. In preferred embodiments an external battery source is provided to power the control module for the fast switching. In addition, preferred embodiments of the present invention include temperature sensors which provide information about the temperature of each of the thyristor packages to the Controller. Use of such temperature sensors can be an important advantage in at least 2 respects. First, it will allow the system to detect if the thyristors begin to operate outside of permitted temperature specifications and to take appropriate corrective action. Second, it may be that the time lag values described above may be affected by the temperature of the thyristors, and thus temperature information can be used, to the extent appropriate, to adjust the known delay information as described above.

As illustrated in FIG. 1A, the present invention includes switching between any two AC sources for a given load, independent of where those sources and the load are located. As noted above, however, the present invention is especially advantageous for situations in which the load is located on a mobile vehicle and at least one of the AC sources is located on that vehicle, such as would occur in the case of a ship, vessel, yacht, recreational vehicle (RV) and the like, and the other AC source is off-board with respect to the vehicle (e.g., at an access point to an on land electrical grid). In operation such embodiment would typically involve the ship, vessel, yacht, recreational vehicle (RV) and the like being in traveling state in which the on-board power source (e.g., AC generator) is running and providing power to the on-board load, such as air conditioning units, freezers, refrigerators and other electrical and/or electronic equipment and devices on board. At the time that the vehicle is ready to transition to a non-traveling condition, such as when a ship docks at berth on shore, the operator of the vehicle will desire to switch the on-board load to the stationary (e.g., on-shore) power source. Such a situation is illustrated in FIG. 2 for the purposes of convenience, although it will be appreciated that the means and methods disclosed herein in connection with this embodiment are applicable generally independent of the location of the loads and the AC sources.

With particular reference to FIG. 3, two shore power access points are available shore side (labeled Shore Power A and Shore Power B) and each includes isolation transformers, or galvanically isolated frequency converters/voltage regulators, and the ship has two on board AC power sources (Generator A and Generator B). As will be appreciated, one or both of the on-shore power sources may not provide a voltage that is required by the load on the ship, and the present invention optionally includes means and methods to boost this voltage to be within the necessary range. In addition, it is the case in many situations that, in addition to the problem of low voltage at one or more of the shore power sources, it is not uncommon that the sources are out of phase with one another, and it is desirable to have means and methods for ensuring that the two stationary power sources are properly combined before being used as the source for the on-board load. Means and methods, including all associated sensors, controllers, electronics, etc., which provide both of these adjustments to adapt the on-shore power source for use, are disclosed in U.S. Pat. No. 11,303,123, which is assigned to the assignee of the present invention, and which is incorporated herein by reference. Such boosting and combining means and methods are optionally but preferably included in the AC power control systems and methods of the present invention, as illustrated by the blocks "boost and/or "combine" in FIG. 3.

Figure 2:
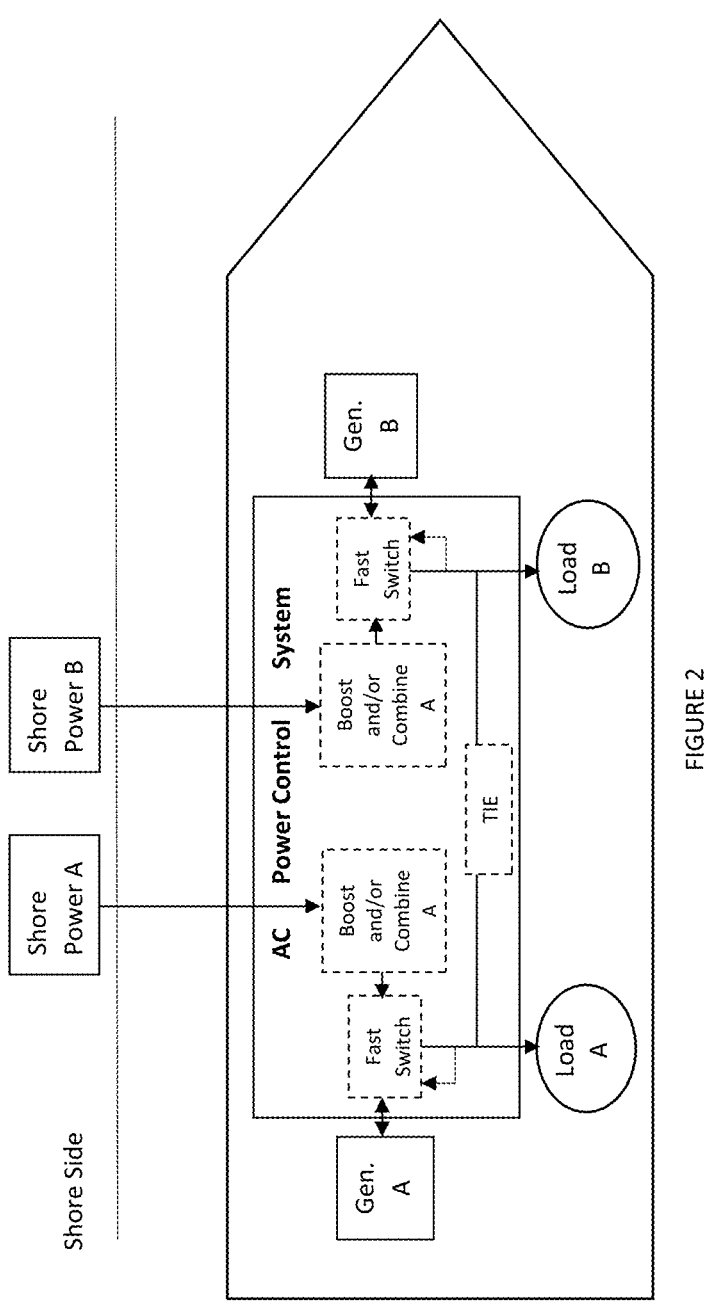
FIG. 2 is a schematic block flow chart showing the systems and methods according to one embodiment of the present invention involving two off-board AC power sources, two on-board AC power supplies and a generalize block flow diagram representing an AC power control system according to one embodiment of the present invention implemented in connection with a water-born vessel at dock or berth.
Figure 4:
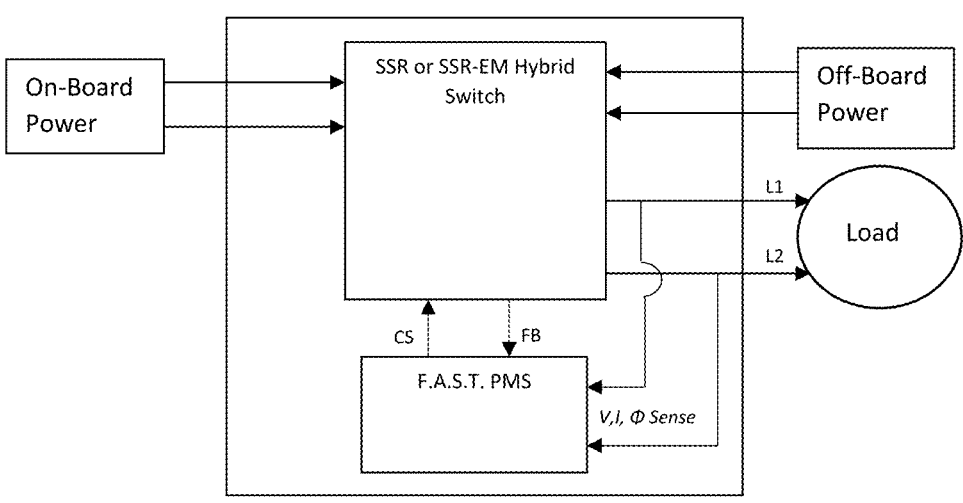
FIG. 4 is a process flow diagram showing one embodiment of the systems and methods of the present invention showing schematically an SCR based switching circuit and an SCR-electromagnetic hybrid switching circuit in cooperation with a FAST controller module leading to seamless transfer according to the present invention.

Systems and methods similar to those disclosed in connection with FIGS. 2 and 3 are illustrated in FIG. 4, but without illustrating the relative locations of the onboard power and offboard power supplies. Thus, the scope of the systems and methods disclosed in connection with FIG. 4 can be implemented in connection with any type of vehicle, including sea vehicles, land vehicles and vehicles which travels through the air. The illustrated embodiments include a block diagram for a FAST solid state switching circuit (including particularly circuits which can consist of one or more SCRs such as thyristors, or may alternately comprise both SCR components and electromechanical (EM) components) to affect the seamless switching of the present invention. The onboard power, the offboard power, and the loads are all connected to the FAST switching circuit so as to allow seamless transfer of electrical power for the load between the onboard power and the offboard power sources. The operation of the preferred system and methods of the present invention includes sensors for obtaining information about the voltage, the current and the phase of each of the lines leading to and from the switching circuit. This information is transmitted to the FAST microprocessor (which is included in the block labeled as FAST PMS), and as described herein provides control signals (CS) to the switching circuit to ensure seamless switching between the onboard an offboard sources of power. In preferred embodiments, information is also transmitted from the switching circuit, in the form of feedback (FB) signals, which permit the microprocessor in the preferred aspects of the invention to monitor and adjust as necessary the parameters associated with the switching circuit.

Figure 5A:
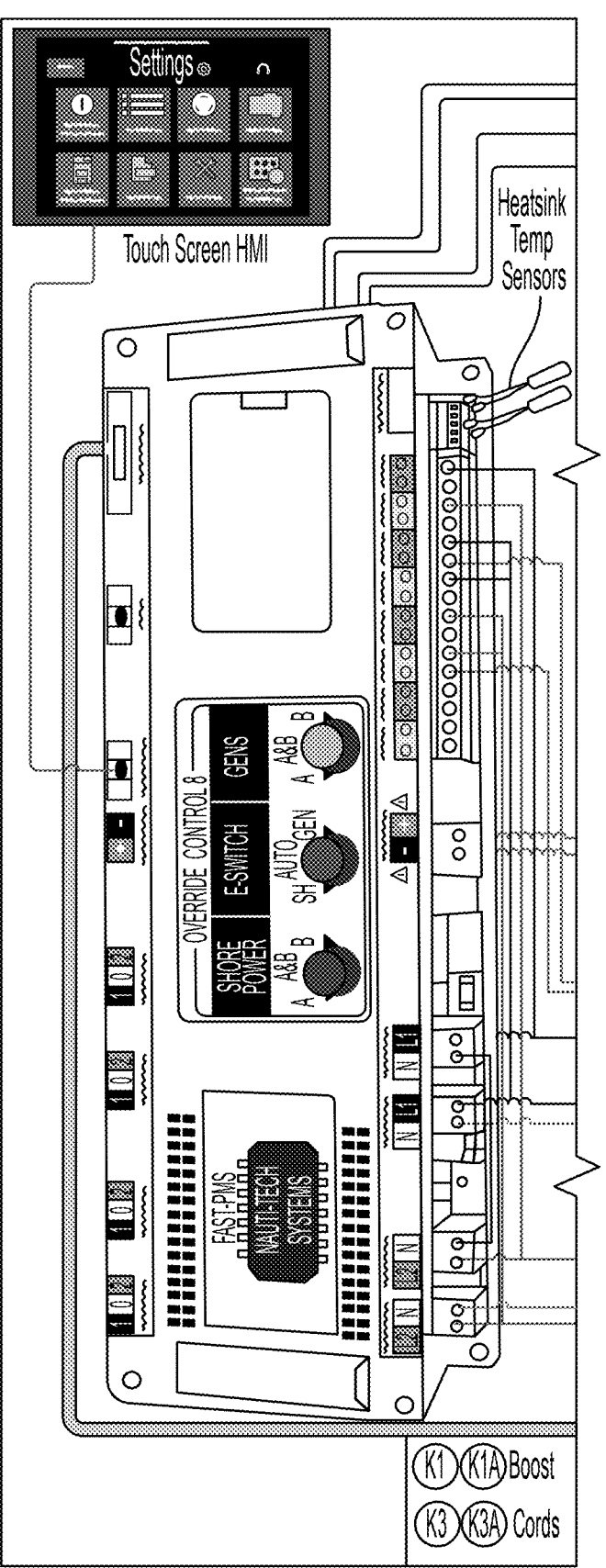
FIG. 5A is a semi-schematic circuit diagram according to one embodiment of the systems and methods of the present invention showing switching circuits using back-to-back thyristors coupled to a control module of the present invention to achieve seamless switching according to one embodiment of the present invention.
Figure 5A:
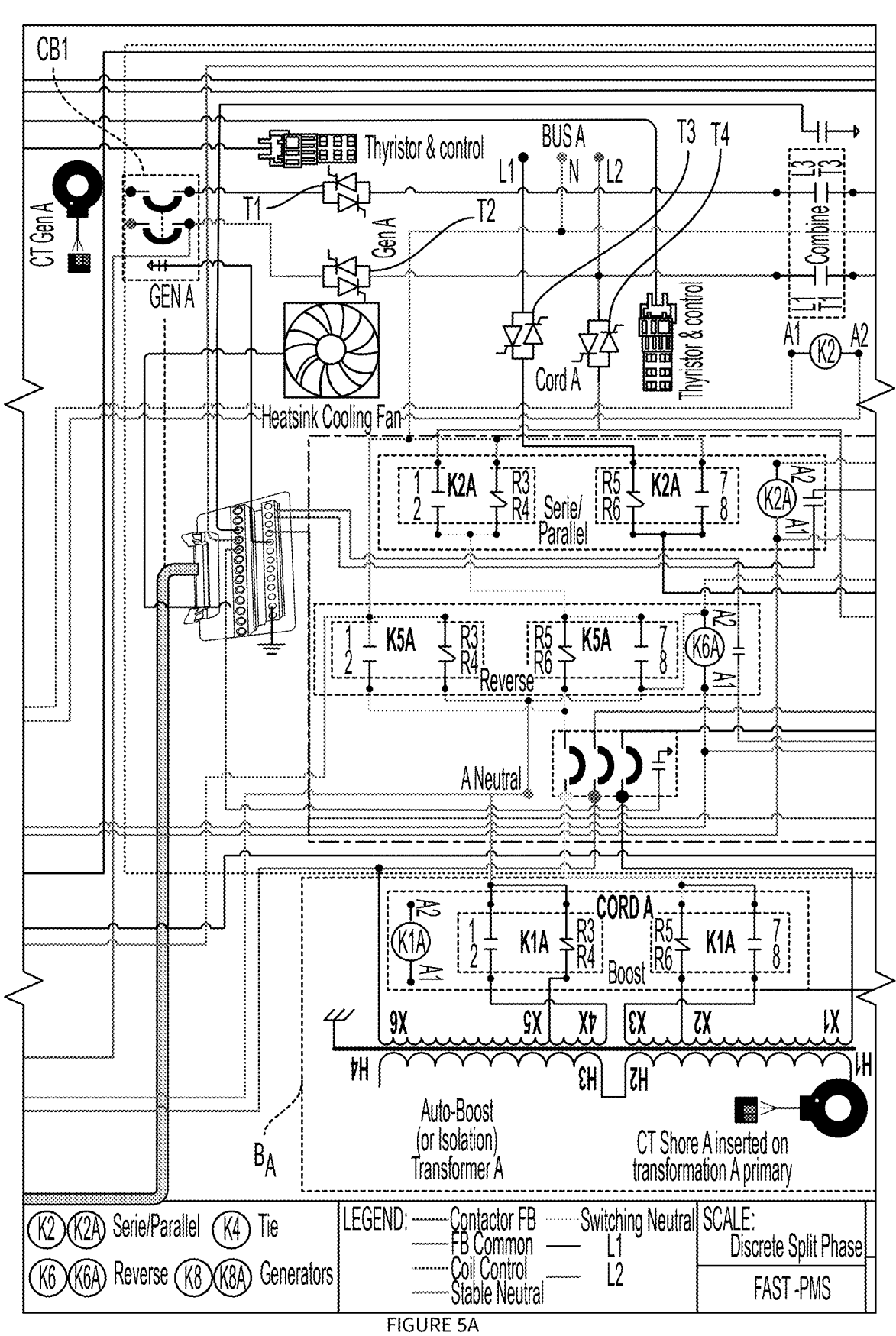
Figure 5A:
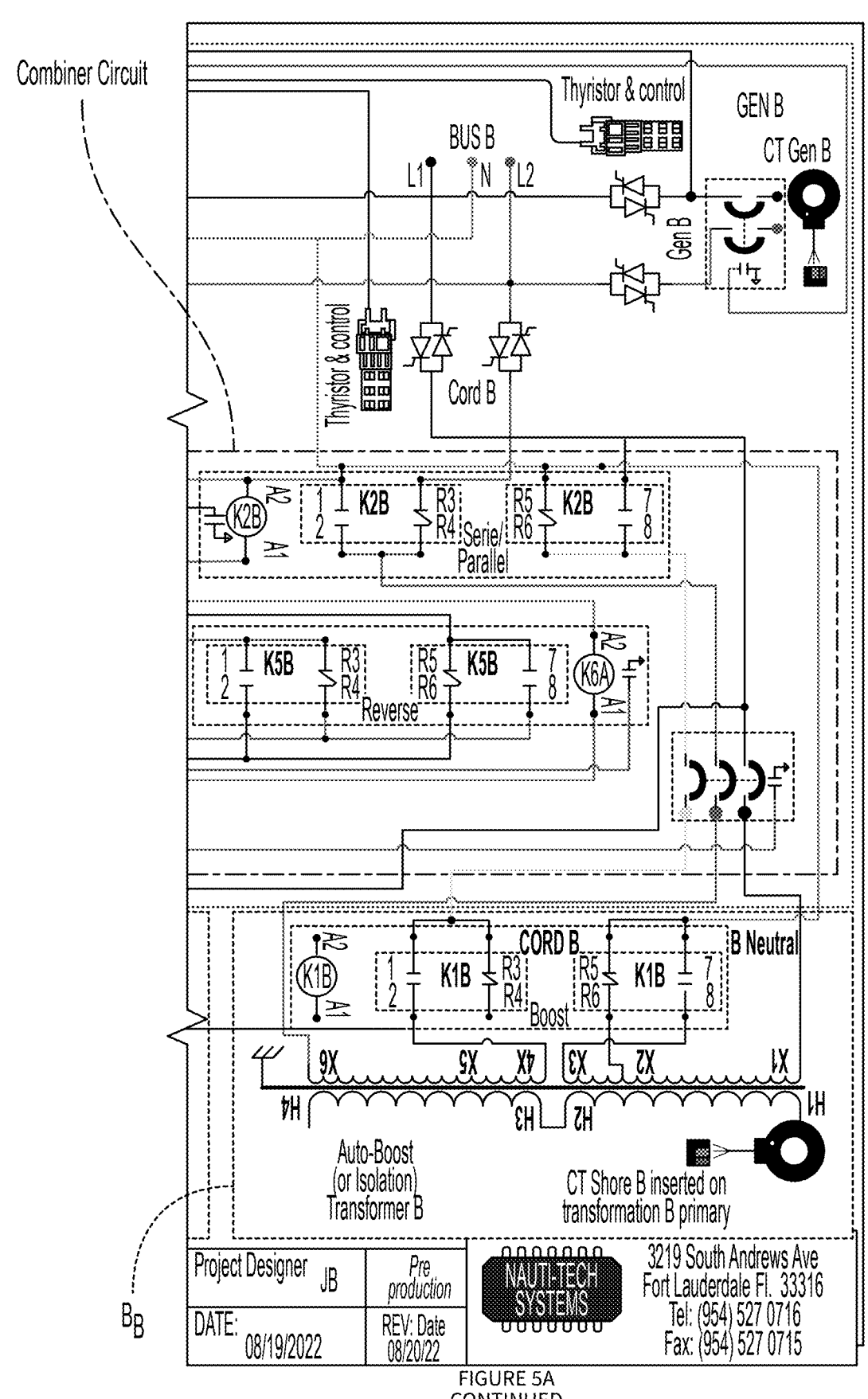

With reference now to FIG. 5A, a particular embodiment of the present invention adapted for use on a ship or vessel having two load buses, two onboard generators, and the possibility of connecting to two different onshore AC power sources is illustrated. For the purposes of convenience, the seamless switching circuit of the present invention will be described in connection with the generator later labeled as "GEN A" and the off-board power source labeled Shore A. The seamless switching circuit of the present invention is connected to line 1 (L1) and line 2 (L2) through a pair of circuit breakers CB1. A back-to-back thyristor package T1 is interposed between circuit breakers for Generator A and a first on board load labeled as BUS A. Similarly, a back-to-back thyristor package is provided in line 2 between the respective circuit breaker for line 2 of Generator A and line 2 of BUS A. One or more cooling fans are included to help dissipate heat generated by the thyristors in the illustrated systems. Similarly, a back-to-back thyristor package is also interposed between line 1 of BUS A and line 1 of Cord A, which in preferred embodiments represents AC current from Shore Power A after it has been boosted as described herein and then, to the extent appropriate and/or necessary, combined with AC from Shore B. Another back-to-back thyristor package is also interposed between line 2 of BUS A and line 2 of Cord A, which in preferred embodiments also represents AC current from Shore Power A after it has been boosted as described herein and then, to the extent appropriate and/or necessary, combined with AC from Shore power source B. Thus, this set of four (4) thyristor packages is used in accordance with the present invention, when controlled by a microprocessor and metering chip of the present invention and contained for convenience within the control box labeled as "Override control") in the figure, to effectuate seamless transfer such that the power supply to load BUS A seamlessly is switched between Generator A and Shorepower A, or vice versa. A similar set of switching circuits is provided for switching between Generator B and Shorepower B.

Figure 5B:
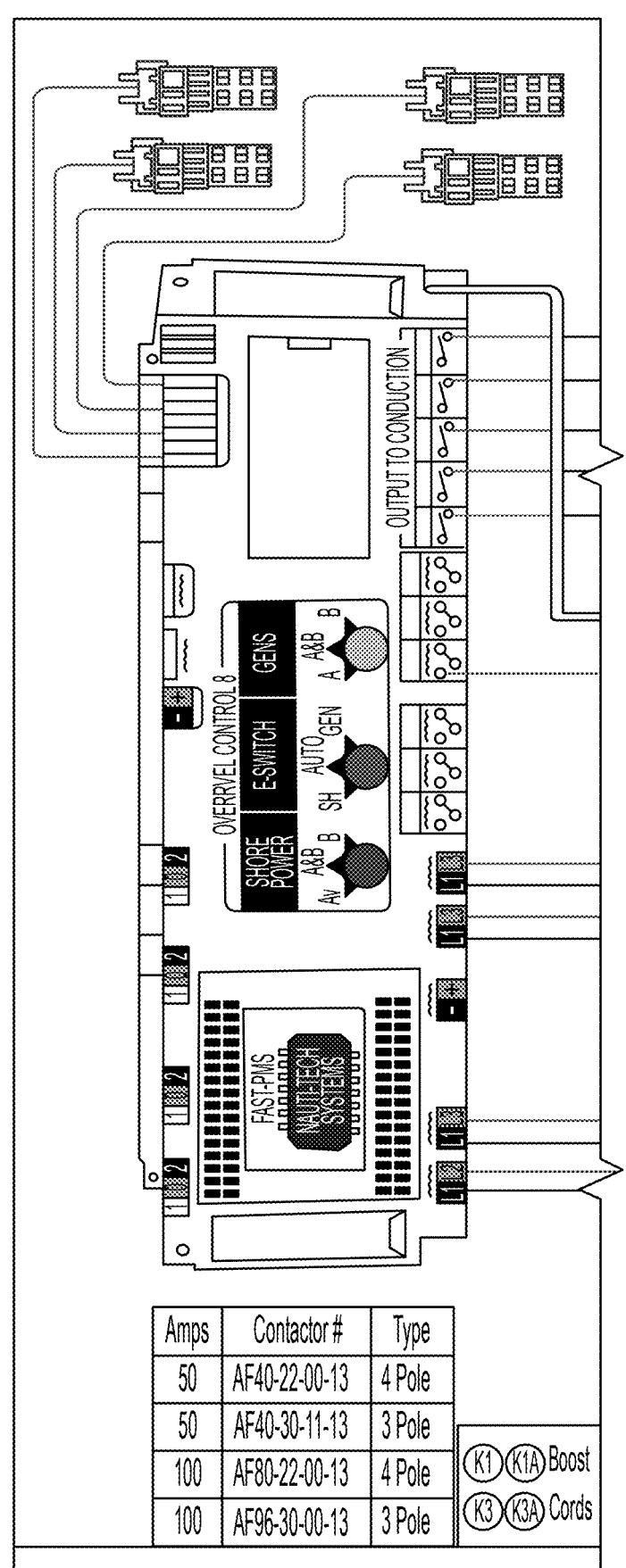
FIG. 5B is a semi-schematic circuit diagram according to the embodiment of the systems and methods of the present invention as shown in FIG. 5A, except further including back-to-back thyristors coupled to the tie-breaker circuit of the present invention to enhance the achievement of seamless switching, especially according to embodiments of the present invention when, for example, multiple off-board sources are being combined and/or when multiple on-board load buses are being connected.
Figure 5B:
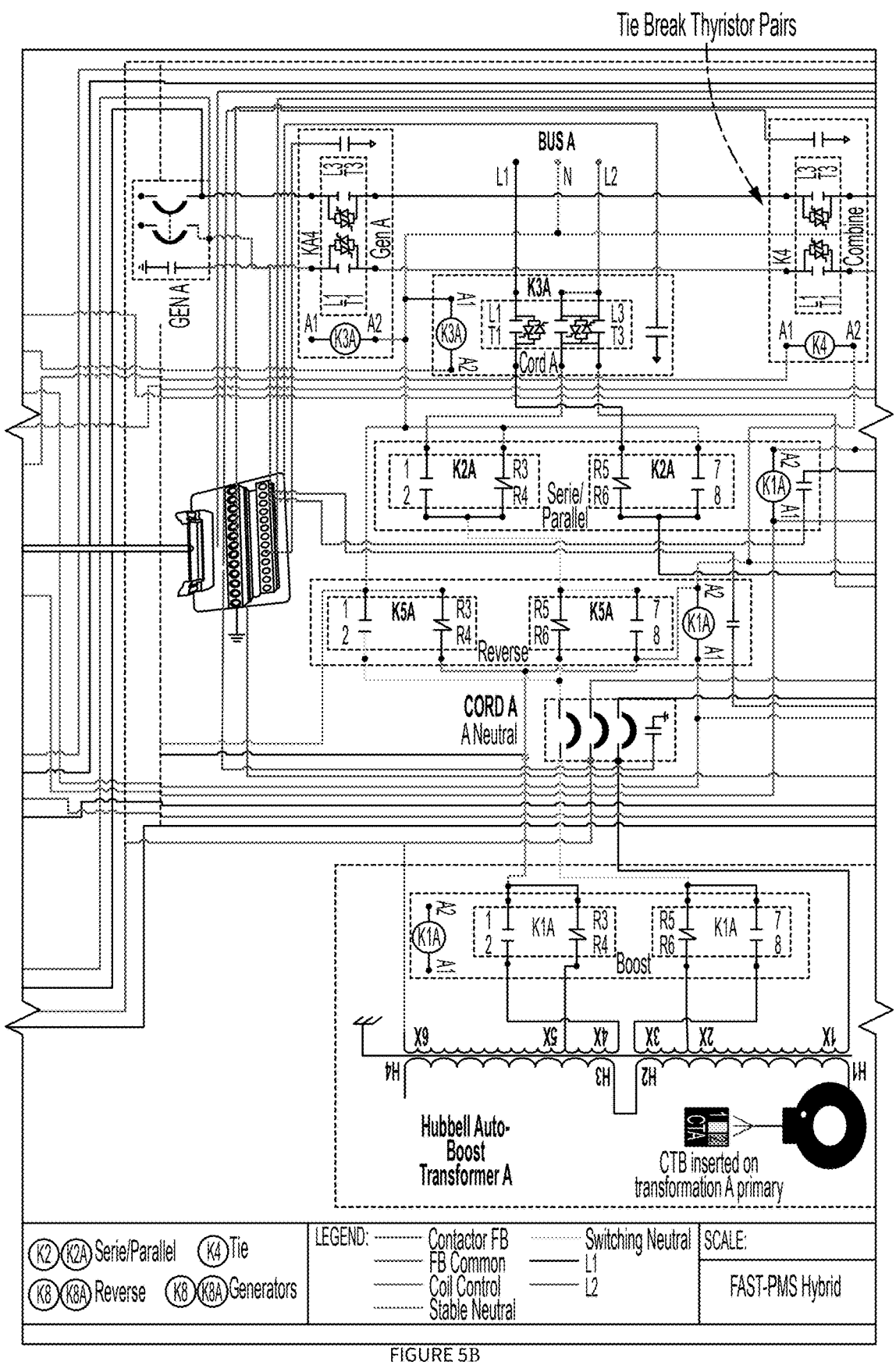
Figure 5B:
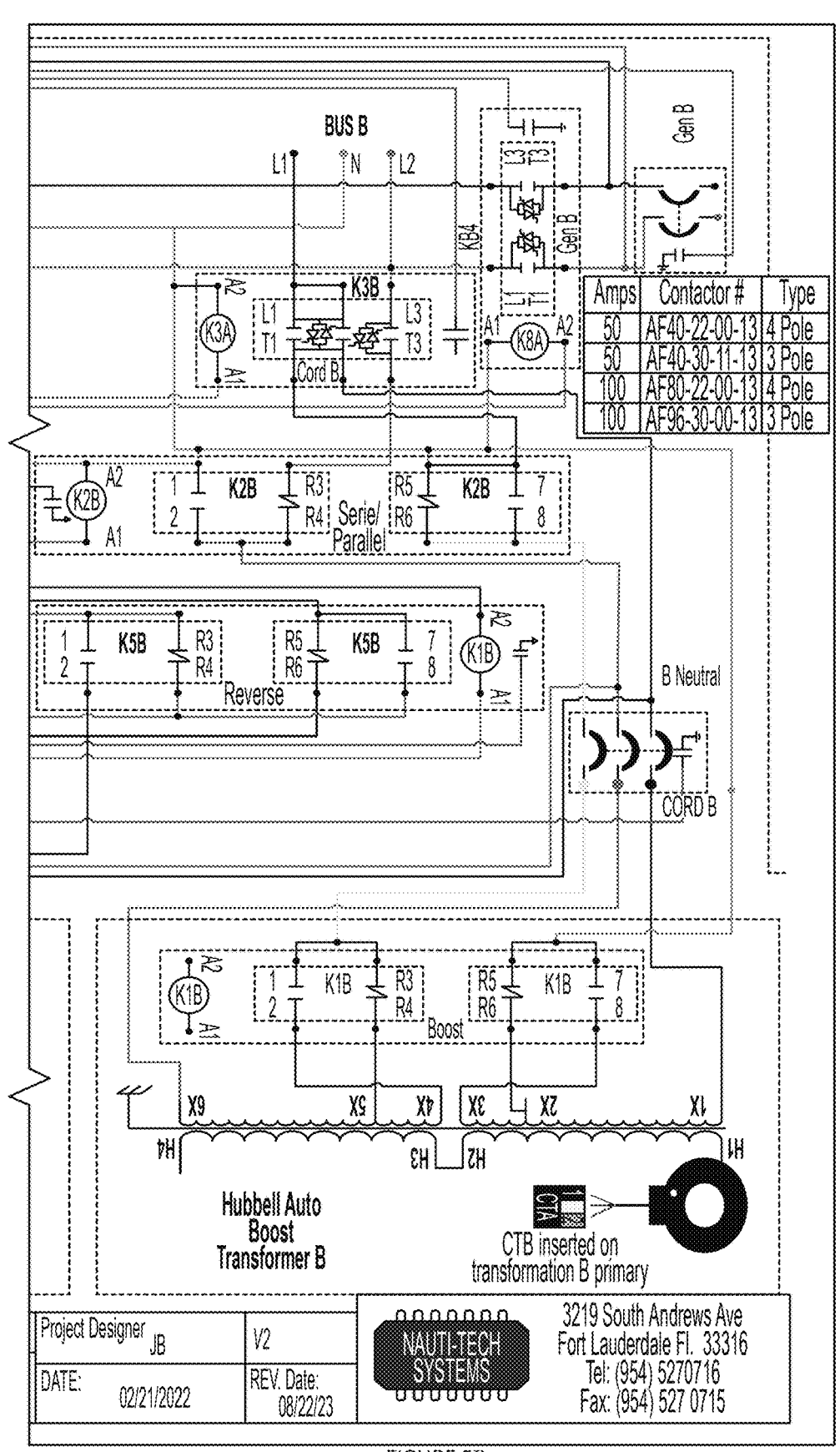
Figure 6:
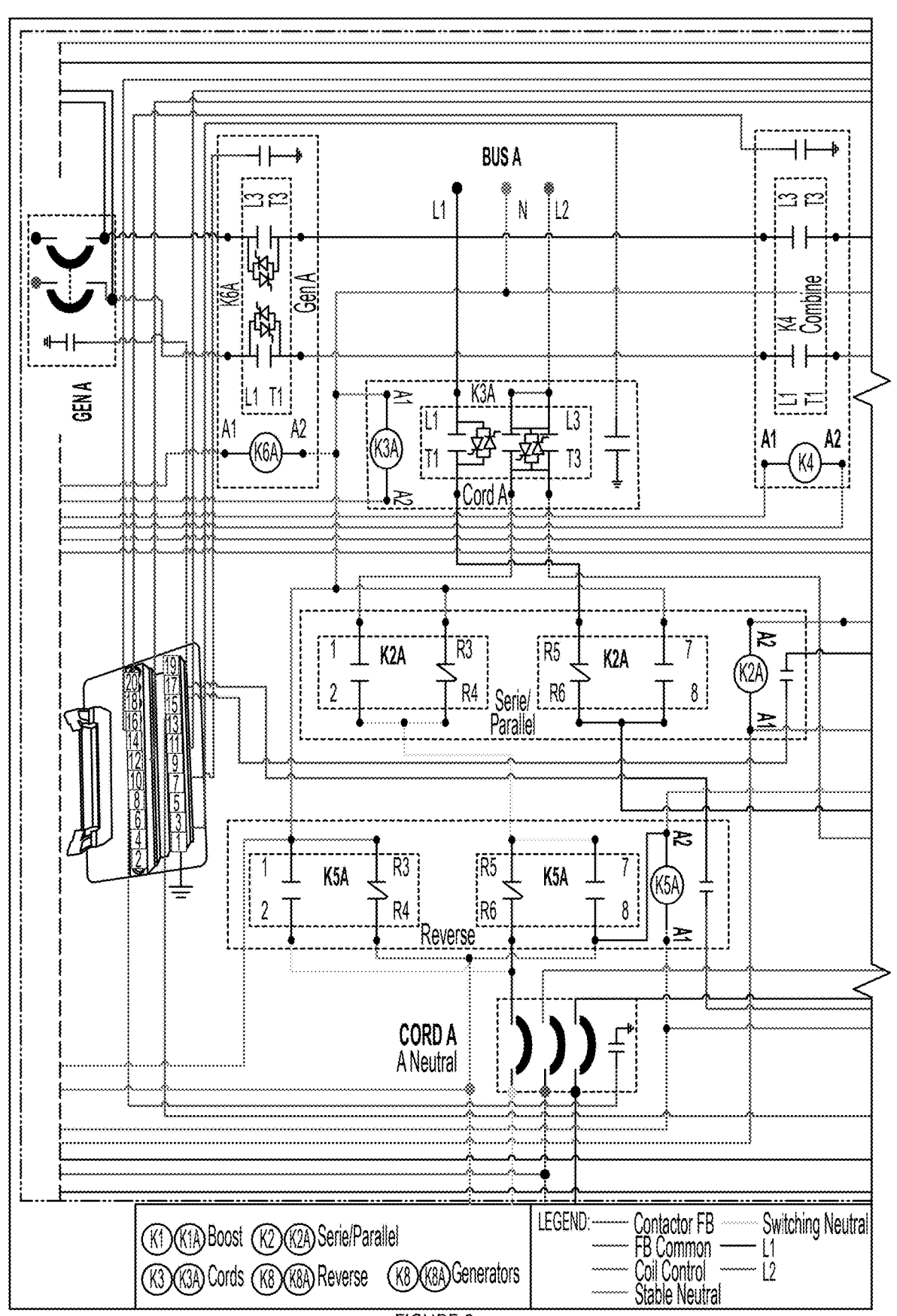
FIG. 6 is a semi-schematic circuit diagram according to one embodiment of the systems and methods of the present invention showing back-to-back thyristors in combination with EM switches and coupled to a control module of the present invention to achieve seamless switching using hybrid switching circuitry according to one embodiment of the present invention.
Figure 6:
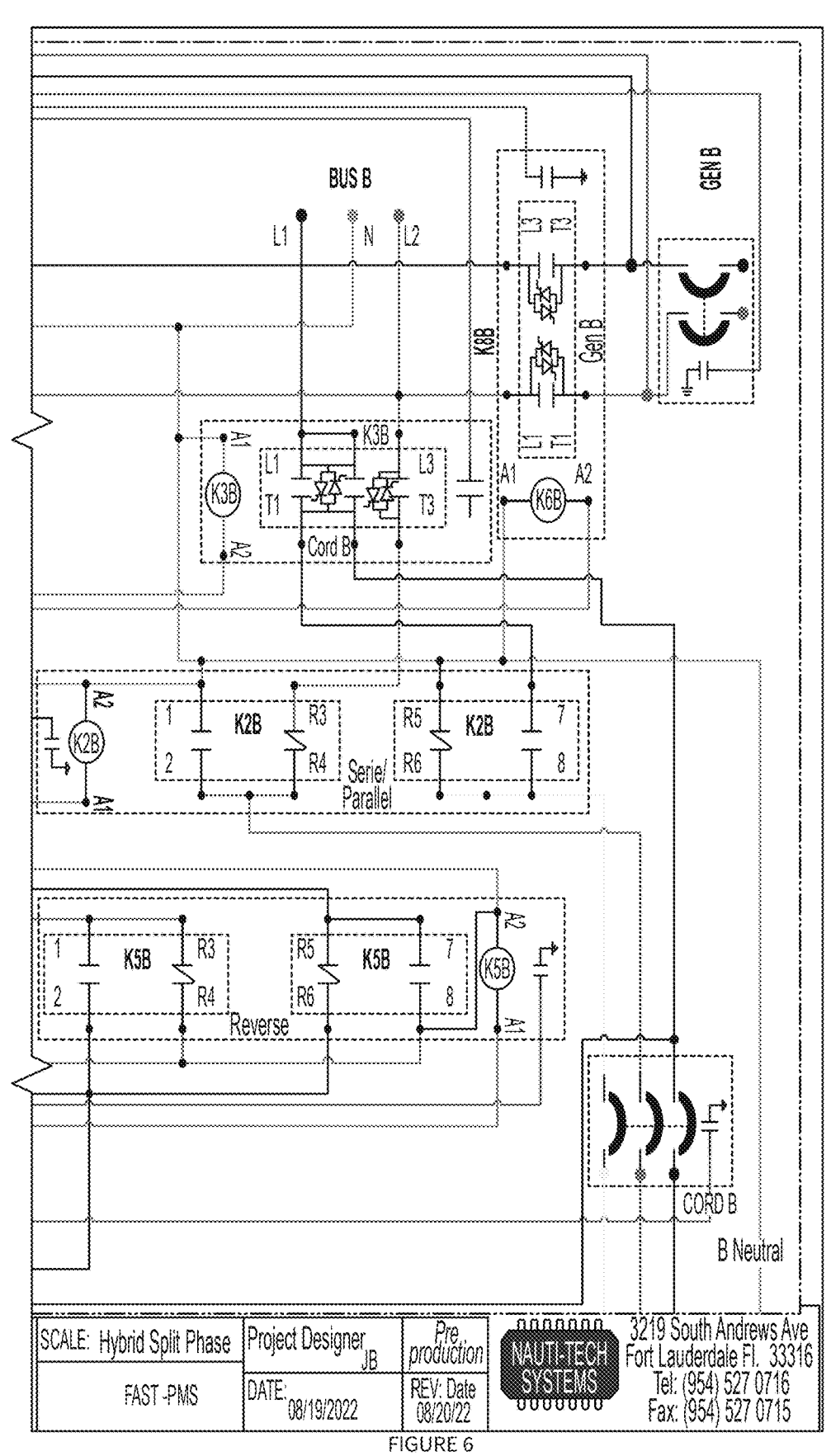
Figure 7A:
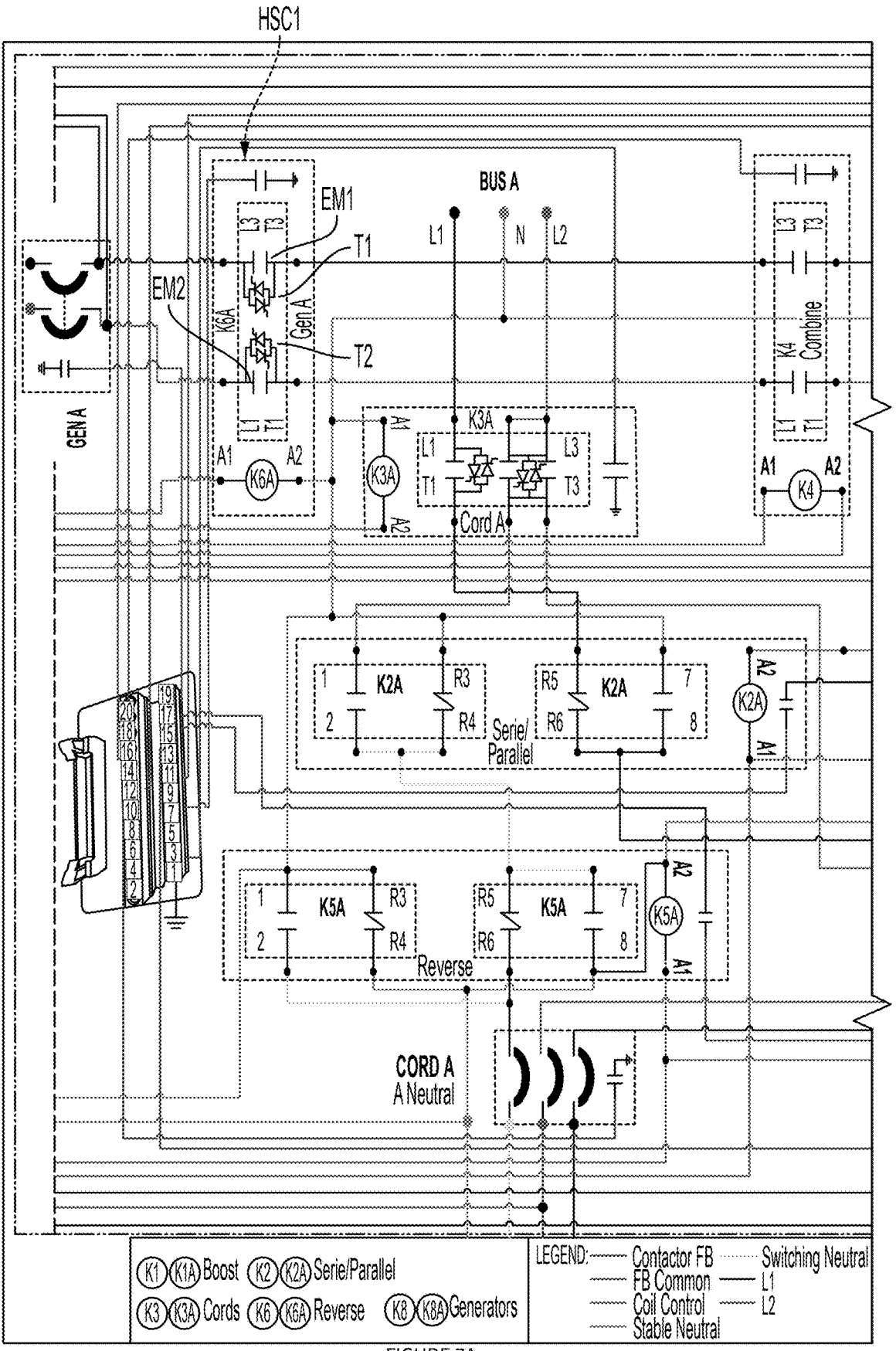
FIG. 7A is an enlarged view of a portion of FIG. 6.
Figure 7A:
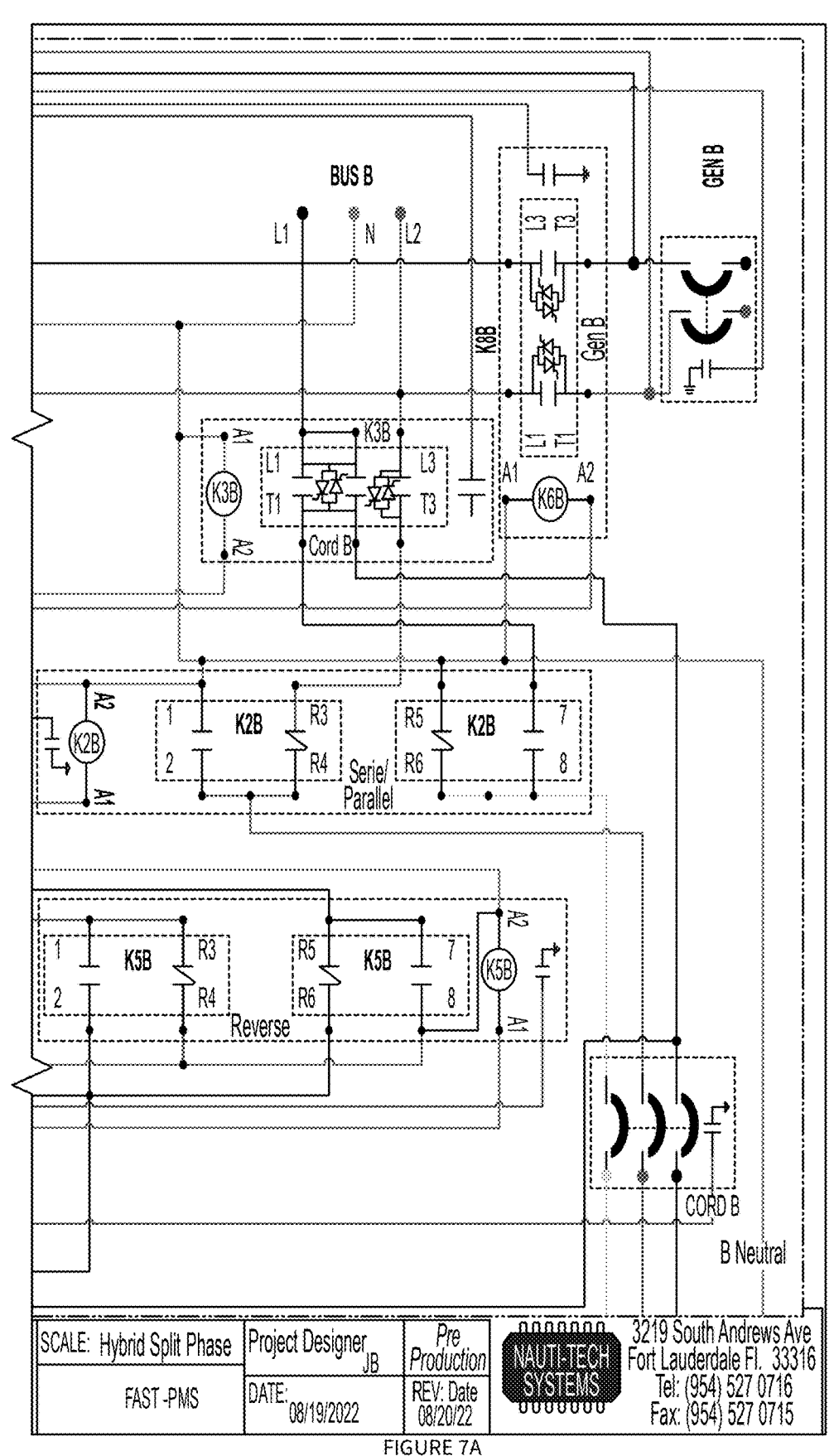
Figure 7B:
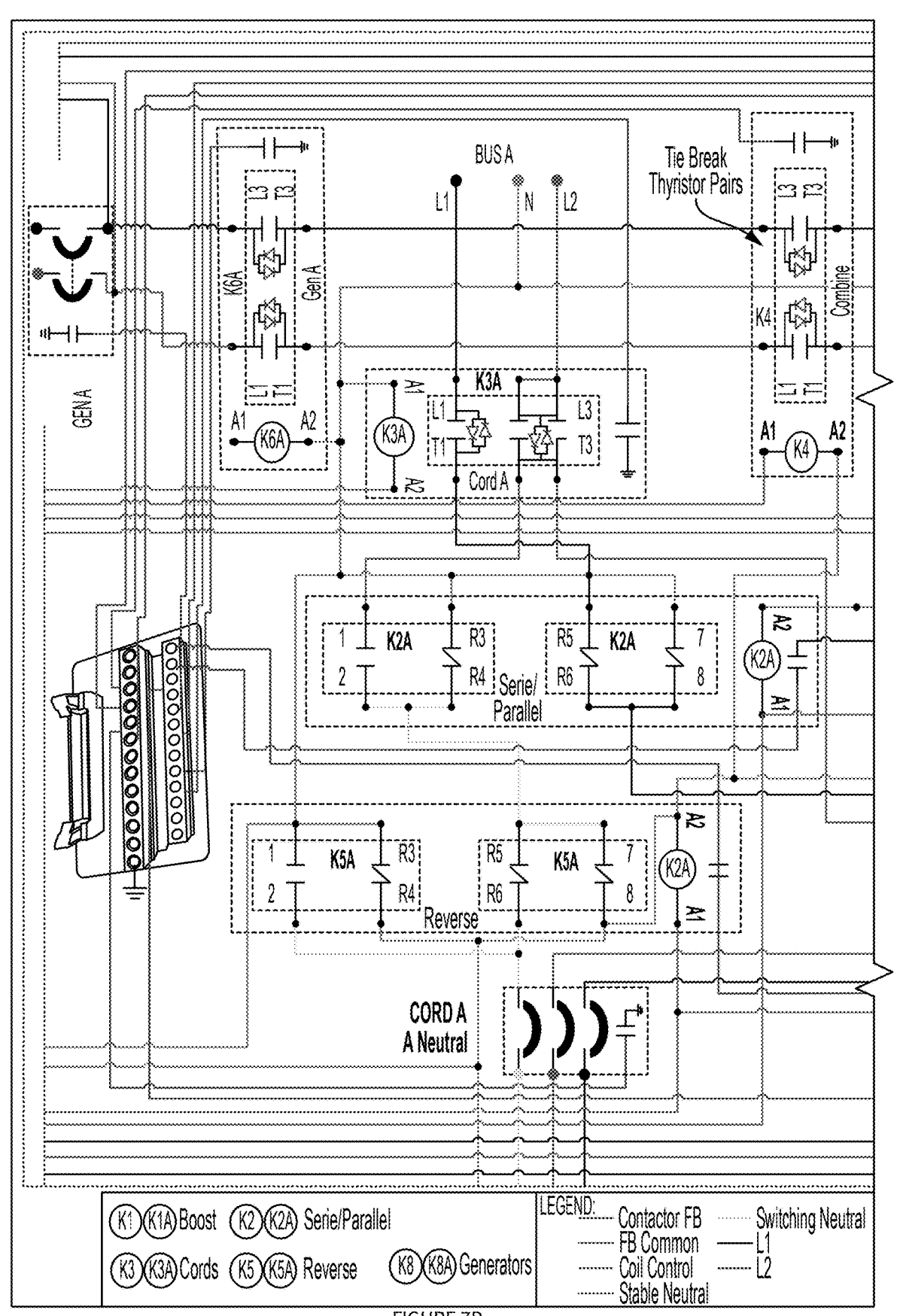
FIG. 7B is a semi-schematic circuit diagram according to the embodiment of the systems and methods of the present invention as shown in FIG. 7A, except further including back-to-back thyristors coupled to the tie-breaker circuit of the present invention to enhance the achievement of seamless switching, especially according to embodiments of the present invention when, for example, multiple off-board sources are being combined and/or when multiple on-board load buses are being connected.
Figure 7B:
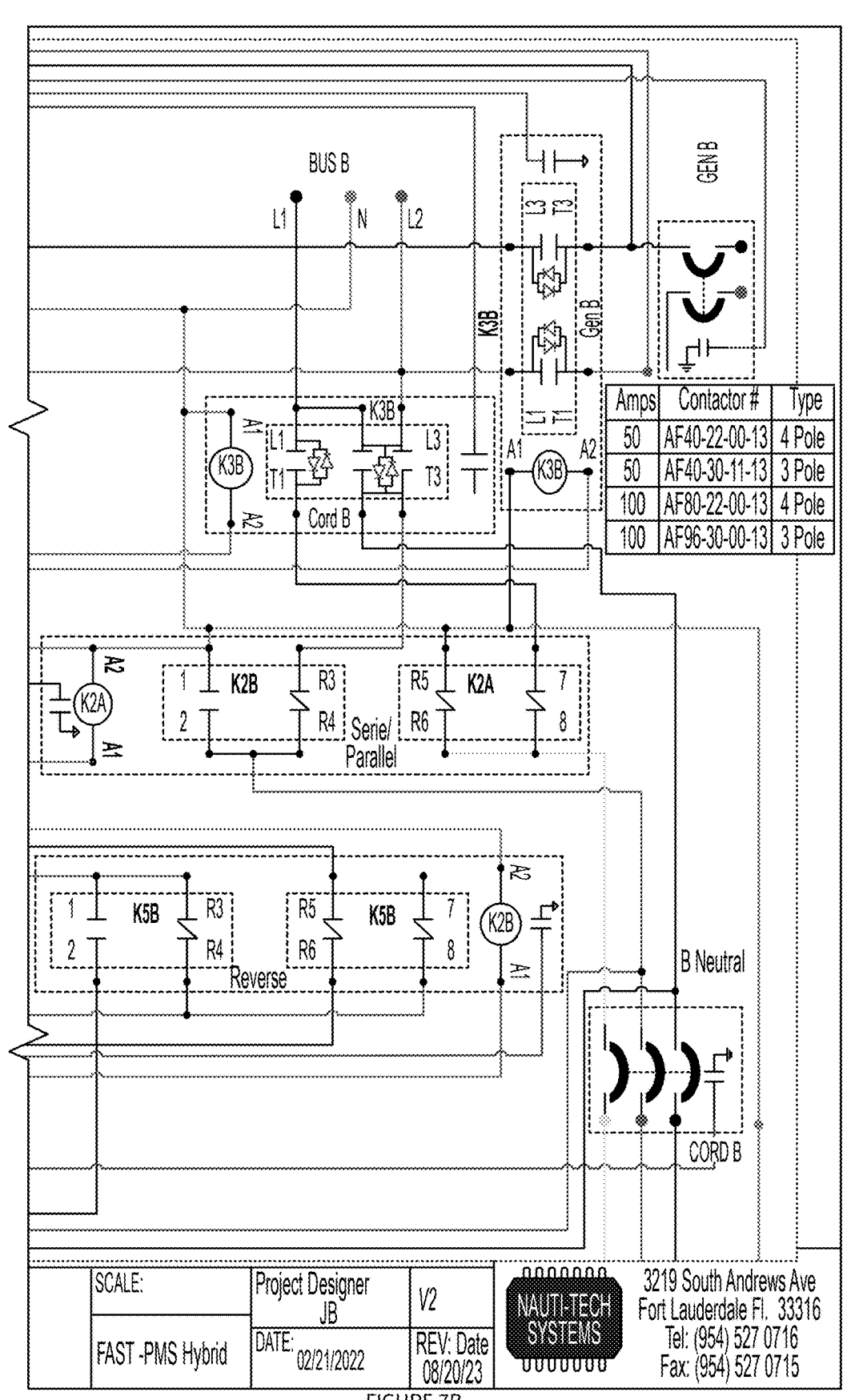
Figure 8:
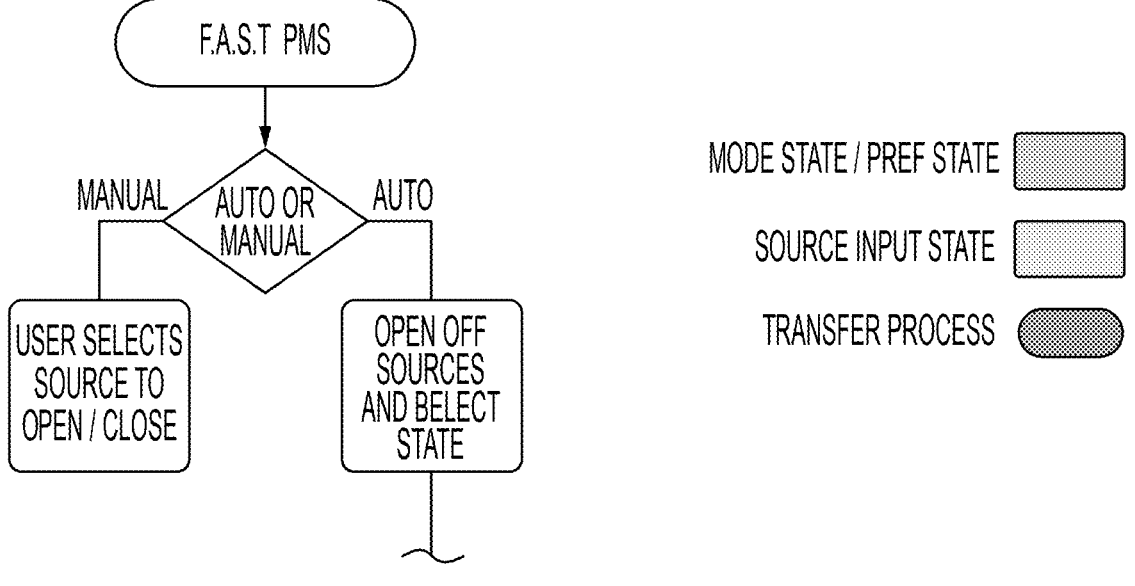
FIG. 8 is a process flow diagram showing the decision process implemented in a preferred microprocessor of the present invention to make selections for which AC sources and which loads will be seamless switched according the present invention in cases involving two on-shore AC sources, two on-board AC sources and two on-board load buses.
Figure 8:
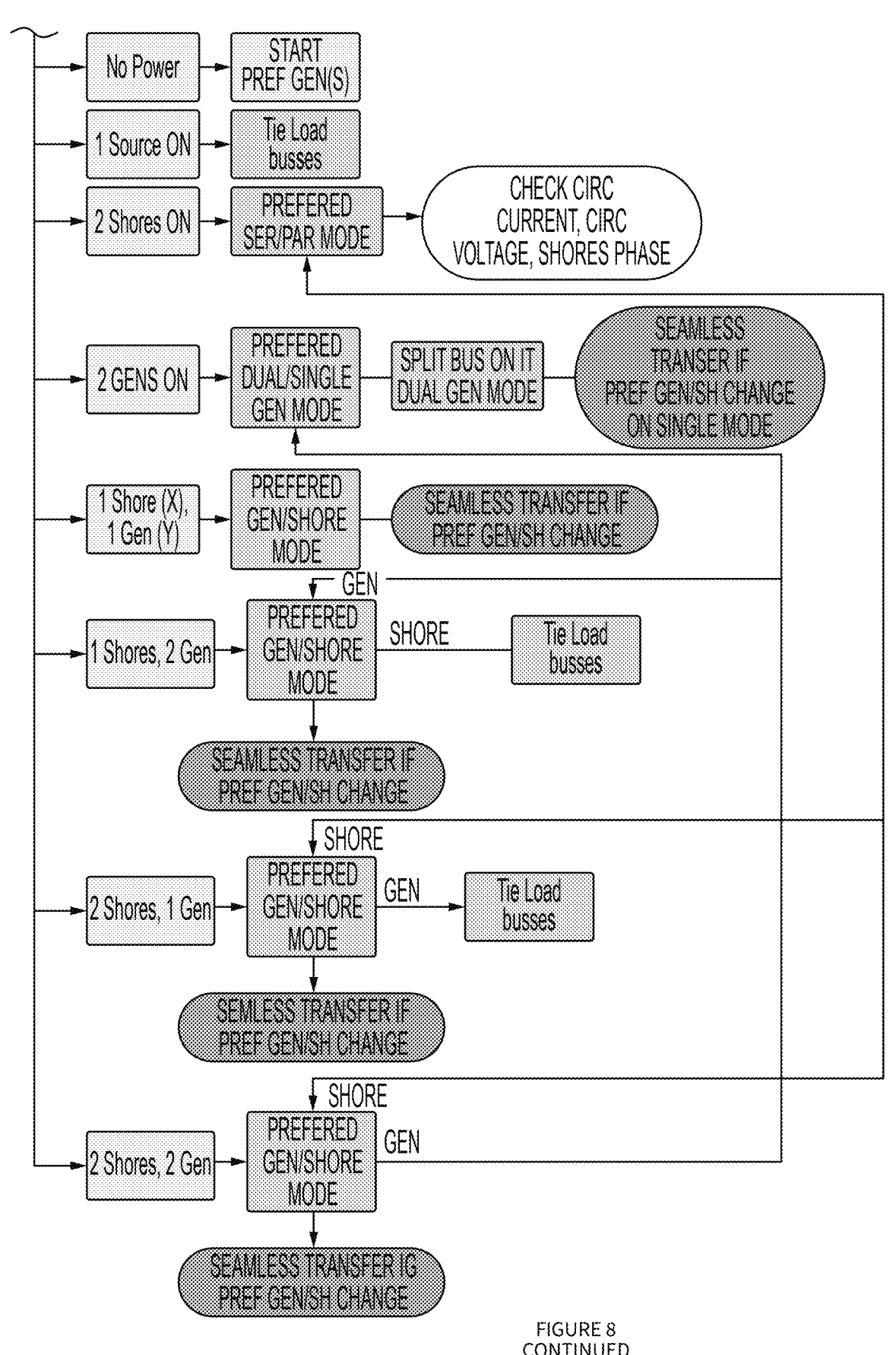

With reference now to FIGS. 5B, 6, 7A and 7B, a particular embodiment of the present invention similar to that disclosed in FIG. 5 is illustrated, except that the switching circuits of the present invention are hybrid switching circuits, and further except that in connection with FIGS. 5B and 7B, the tie breaker circuit is coupled to and operates substantially as described above with thyristor pairs to enhance seamless transfer, especially when it is intended to transfer two on-board load buses and/or two on shore power supplies. With particular reference now to FIG. 7A, one of the hybrid switching circuits of the present invention will be described in detail. More particularly, the illustrated embodiment contains a hybrid switching circuit HSC1 included between the circuit breakers for Generator A and BusA load located on board a vessel. In addition, the switching circuit of the illustrated embodiment includes a first electromagnetic switch EM1 associated with thyristor T1 and a second electromagnetic switch EM2 associated with thyristor T2. In operation, the control unit of the present invention (see FIG. 6), includes hardware and software (preferably including microprocessors) which operate after seamless switching has occurred in accordance with the present invention, as described in detail above in connection with FIG. 5A. In such embodiments, the control module of the present invention substantially simultaneously affects deactivation of the thyristor and closing of the electromechanical switch. In this way, each thyristor is not constantly passing current over the entire course of operation of the vessel, but instead is used only a relatively short period of time to effectuate seamless transfer as described herein. Such hybrid embodiments have particular advantage in connection with, for example, retrofit situations wherein space constraints would make it difficult or impossible to include the necessary heat removal mechanisms required for continuous running of the thyristors. Such embodiments also have the independent advantage of potentially extending the useful service life of the thyristors since they will be operating for only a relatively small fraction of the time that vessel is in operation.

EXAMPLE

Figure 9:
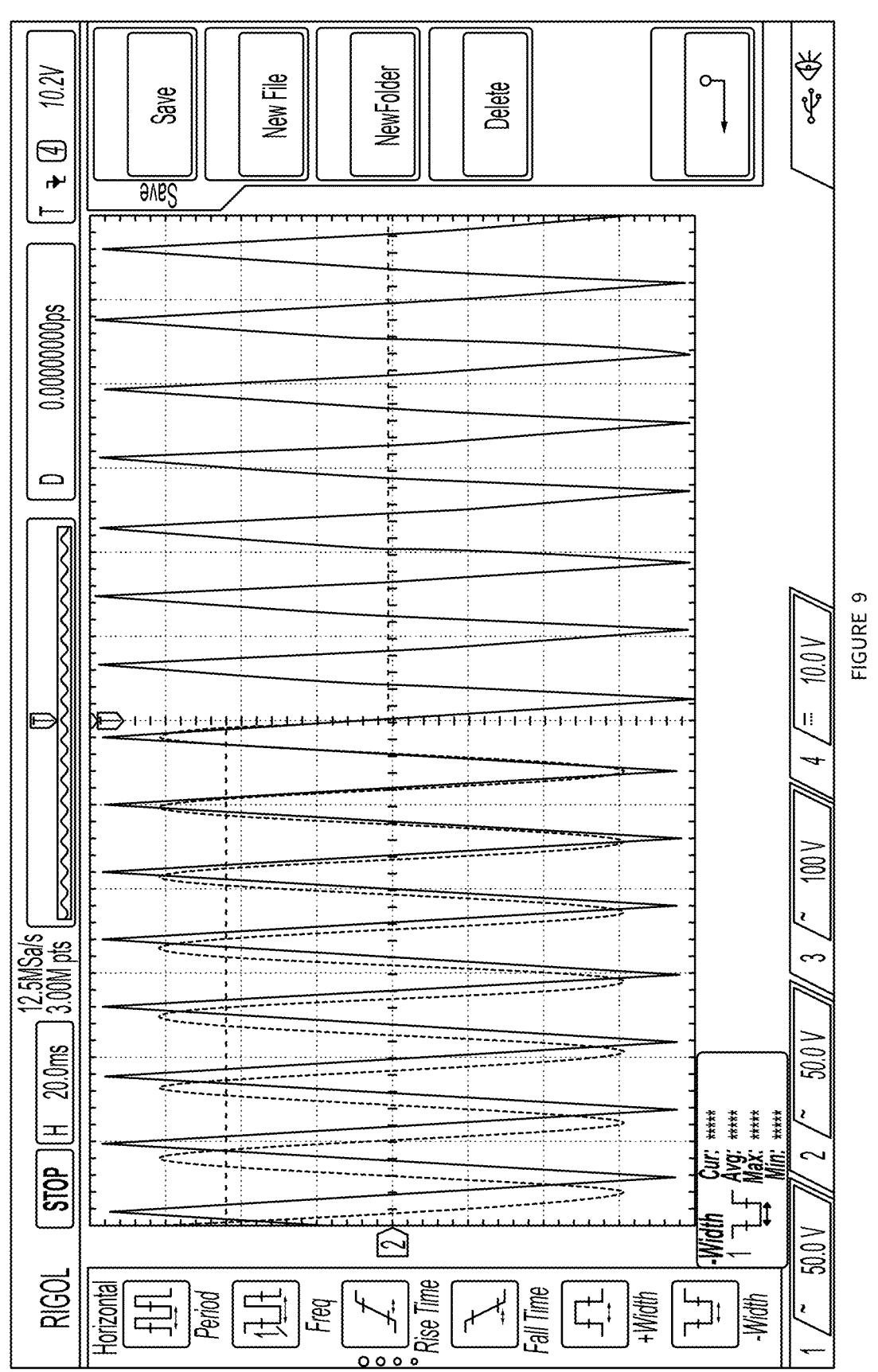
FIG. 9 is an oscilloscope trace showing the source and load voltages over time as described in the Example.

A system as disclosed herein and illustrated in the Figures hereof, particularly FIGS. 1A, 1B, 2, 4, 6, 7 is operated to switch a single load from a single land based electrical power source (represented by Shore A in FIGS. 6 and 7) to a single operating generator (represented by Gen A in the FIGS. 6 and 7). An oscilloscope trace of the load voltage (having a voltage amplitude of about 190 V) and the generator voltage (having a voltage amplitude before switching of about 155 V) is illustrated in FIG. 9. As can be seen, at the start of the trace, the load voltage and generator voltage are out of phase, and the systems and methods of the present invention as described herein determined that a synchronous zero crossing would occur at time of about 120 microseconds from the beginning of the trace shown in FIG. 9 (6 major segments×20 microseconds per segment). As illustrated, the generator voltage appears to disappear on the scale shown in FIG. 9 after this point due the seamless switching of the present invention producing an essentially identical trace for the load and the generator.

Figure 10:
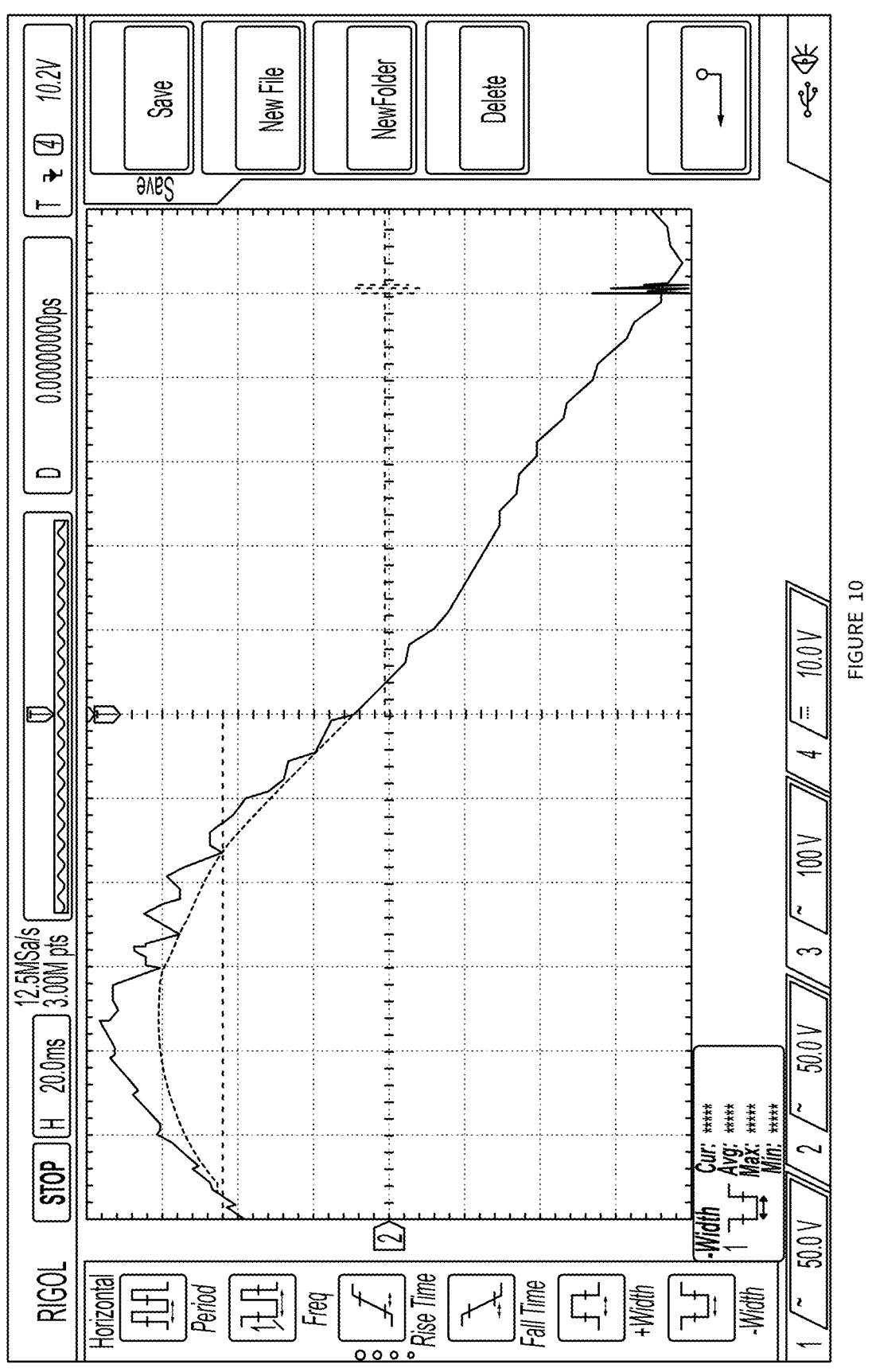
FIG. 10 is an oscilloscope trace showing the source and load voltages over time as described in the Example.

An enlarged image of the switching operation described in this example is shown by the tracing in FIG. 10, which illustrates the portion of the tracing shown in FIG. 9 but with greater resolution around the switching operation according to this example. In particular, the thick horizontal line on the trace from the beginning of the trace and for about 6 microseconds (6 segments×1 microsecond per segment) represents the open condition of the thyristors connected between the load and the generator. That is, during this portion of the trace, the load is being supplied by the AC current from the stationary power source and then the thyristors close the circuit between the load and the generator (represented by the vertical line), and substantially simultaneously the thyristors between the stationary source and the load are opened (not shown in FIGS. 9 and 10). As can been seen, prior to the generator thyristors closing, the load voltage and the generator voltage differed in amplitude and rate of change over time. According to the operation of the present systems and methods, the control signal triggering closing of the thyristors (designated by the downward facing arrow labeled with T in the tracing) arrives at the thyristor at about 0.5 microsecond ahead of the actual synchronous crossing. From about this time and for the remainder of the time shown in the tracing, the load voltage and generator voltage are an essentially overlapping. This overlap illustrates successful seamless transfer according to the present invention. The only exception to this essentially complete trace overlapping occurs on the trace at about 5 microseconds after the thyristors close. As described above, the circuit of this example is a hybrid circuit in which the present systems and methods reroute the current through EM relays once seamless transfer has been effected so that the thyristors can be taken out of the circuit once the seamless switching has occurred. As a result, there in series of short and small voltage spikes on the trace that coincide with this transition. However, the load and generator traces continue to substantially overlap during this transition, illustrating that the advantages of the present invention remain present with hybrid operation as disclosed herein. Of course, no such spikes would be present in those embodiments in which the current continues to be handled by the thyristors.

In preferred embodiments of the present systems and methods, the following features in addition to the FAST technology described herein are present:

a. Simple and economic to install, set-up and operate;

b. Ability to automatically stop and start power generators that either AS or CS;

c. Ability to combine two or more separate shore sources to better balance loads;

d. Ability to manage polarity correction and safe disconnect;

e. Automatic load balancing;

f. Selective load shedding;

g. KWH, frequency, current & voltage & events & alarms logging and monitoring;

h. Daisy-chainable 7" inch touch screen for control of the system and methods which can be integrated to your systems via Modbus or TCP/IP;

i. HMI to show the real time status of the systema and methods, giving access to simple instant manual override and to other adjustable settings;

j. Fully integratable with commercial boost and marine transformers, such as Nauti-Boost™ and Hubbell™ Marine transformers;

k. Adaptable for single phase, split phase and 3 phase installations;

l. Adaptable for dual or single bus load systems;

m. Ability to provide 3 phase detection;

n. Provision of event and alarm logs;

o. Provision of voltage and current metering.

Photographic depictions of an embodiment which possess many of these features is described in the provisional applications from which the present invention claims priority, each of which has been incorporated herein by reference as if fully reproduced below.

What is claimed is:

1. A method of converting the electricity supplying an alternating current (AC) load from a first AC power source to a second AC power source comprising:

(a) measuring over a time interval the phase of the current of the AC load and the current of second AC power source, (b) determining the zero-crossings of said AC load occurring during said time interval and the zero current of said second AC power source occurring during said time interval;

(c) using a microprocessor-based system to estimate, based on information obtained in said determining step (b), the time of one or more substantially synchronous future zero-crossings of said AC load and said second AC power source;

(d) providing (i) a first solid-state switching circuit in the closed state and connected between said first AC power source and said AC load and (ii) a second solid state switching circuit, that may be equivalent to not equivalent to said first solid state switching circuit, in the open state and connected between said second AC power source and said AC load;

(e) using a microprocessor-based system to send an actuation signal to said second solid state switching circuit, wherein said second solid-state switching circuit has a known actuation delay between the actuation signal from said microprocessor and the occurrence of said switching;

(f) for each of said first and second solid-state switching circuits, at a time prior to said zero-crossing estimate equal to about said respective actuation delay, sending an actuation signal using said microprocess-based system to: (1) change the state of said first solid state switching from open to closed and (2) to change the state of said second solid state switching from closed to open.

2. The method of claim 1, wherein said electricity supplying said alternating current (AC) load is contained in a vehicle and wherein said first AC power source is an on-board AC power source and said second AC power source is an off-board stationary AC power supply.

3. The method of claim 2 wherein said vehicle is a sea going vessel of about 55 feet long or longer.

4. The method of claim 2 wherein said alternating current (AC) load comprises an on-board power distribution system have at least two load buses.

5. The method of claim 4 wherein said off-board stationary AC power supply comprises at least two off-board stationary AC power supplies.

6. The method of claim 5 wherein said at least two off-board stationary AC power supplies are combined prior to said step (e).

7. The method of claim 2 wherein said vehicle is a recreational vehicle.

8. A system for controlling the switching of an alternating current (AC) load contained in a vehicle from on-board AC power generator to an off-board AC power supply comprising:

(a) means for sensing the voltage, current and phase of each of said on-board AC power generator, off-board AC power supply, and said load; and (b) a power control module that comprises:

(i) means connected to said sensing means for monitoring the voltage, current and phase of each of said on-board AC power source, said off-board AC power supply and said on-board AC load, said monitoring means comprising means for monitoring the zero-crossing current of at least said load;

(ii) means for providing an estimate for a given future time period of the zero-crossings of said load current and the zero crossings of said off-board AC power and to determine based on said estimate the existence or not a Synchronous Zero Crossing;

(iii) a first solid-state switching circuit operable in either a closed state or an open state and connected between said on-board AC power source and said load; and (iv) a second solid state switching circuit, that may be equivalent to or not equivalent to said first solid state switching circuit, in state opposite of the state of said first switching circuit and connected between said off-board stationary AC power supply and said load, with each of said first and said second solid state switching circuits having a known actuation delay between an actuation signal being received and the occurrence of switching of said first and second switching circuits; and (v) microprocessor-based control means for sending an actuation signal to each of said first and second switching circuits at a time in advance of said Synchronous Zero Crossing, if determined to be present, by an amount equal to about said known known actuation delay.

9. A method for seamlessly switching the electricity supplying an alternating current (AC) load from a first AC power supply to a second AC power supply comprising:

(a) determining during a time period the zero-crossing of the current of AC load and at least the zero-crossing of the second AC power supply;

(b) estimating for a future time period, based on information obtained in said determining means, the times at which a series of future current zero-crossings of said AC load and at least the current zero-crossing of the second power supply;

(c) based on said estimating step (b), determining whether during said future time period the time of said zero-crossing of said load current and the zero-crossing of the second power supply are within about 0.1 microseconds of each other; and (d) for a time period during which said zero crossings are estimated to be within 0.1 microseconds of each other, switching said load to said second power supply at said time at which said zero crossings are estimated to be within 0.1 microseconds of each other, wherein said switching: (i) uses a solid-state switching system and microprocessor-based control system for actuating said solid-state switching circuit; and (ii) accounts for any known actuation delay between the actuation signal from said microprocessor and the occurrence of said switching.

* * * * *